US010794317B2

(12) United States Patent
Tanaka et al.

(10) Patent No.: US 10,794,317 B2
(45) Date of Patent: Oct. 6, 2020

(54) CONTROL DEVICE FOR COMPRESSION-IGNITION ENGINE

(71) Applicant: Mazda Motor Corporation, Aki-gun, Hiroshima (JP)

(72) Inventors: Daisuke Tanaka, Hiroshima (JP); Yuichiro Tsumura, Aki-gun (JP); Kenko Ujihara, Higashihiroshima (JP); Masayoshi Higashio, Hiroshima (JP); Hiroki Morimoto, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 36 days.

(21) Appl. No.: 16/166,513

(22) Filed: Oct. 22, 2018

(65) Prior Publication Data

US 2019/0145338 A1    May 16, 2019

(30) Foreign Application Priority Data

Nov. 10, 2017    (JP) ................................. 2017-217132

(51) Int. Cl.
*F02D 41/30*    (2006.01)
*F02B 1/14*    (2006.01)
(Continued)

(52) U.S. Cl.
CPC ............ *F02D 41/3064* (2013.01); *F02B 1/14* (2013.01); *F02D 35/023* (2013.01);
(Continued)

(58) Field of Classification Search
CPC combination set(s) only.
See application file for complete search history.

(56) References Cited

U.S. PATENT DOCUMENTS

| 8,464,687 B2* | 6/2013 | Kakuya ............... F02D 41/3076 |
| | | 123/305 |
| 2010/0161203 A1* | 6/2010 | Shigenaga .......... F02D 13/0215 |
| | | 701/110 |

(Continued)

FOREIGN PATENT DOCUMENTS

EP    1164277 A2    12/2001
JP    2008051028 A    3/2008
(Continued)

OTHER PUBLICATIONS

Chen, T et al., "Analysis of cyclic variations during mode switching between spark ignition and controlled auto-ignition combustion operations," International Journal of Engine Research, Sep. 17, 2014, 10 pages.

(Continued)

*Primary Examiner* — Binh Q Tran
(74) *Attorney, Agent, or Firm* — Alleman Hall Creasman & Tuttle LLP

(57) ABSTRACT

A control device for a compression-ignition engine in which partial compression-ignition combustion including spark ignition (SI) combustion performed by combusting a portion of a mixture gas inside a cylinder by spark-ignition followed by compression ignition (CI) combustion performed by causing the remaining mixture gas to self-ignite is executed at least within a part of an engine operating range is provided, which includes a detector configured to detect a given parameter that changes as combustion progresses inside the cylinder, an A/F (air-fuel ratio) controller configured to change an air-fuel ratio of air to fuel introduced into the cylinder, and a combustion controller configured to determine combustion stability based on the detected parameter of the detector and control the A/F controller to reduce the air-fuel ratio when it is confirmed that during the partial (Continued)

compression-ignition combustion the combustion stability is low.

6 Claims, 13 Drawing Sheets

(51) Int. Cl.
- F02D 41/00 (2006.01)
- F02D 41/40 (2006.01)
- F02D 41/24 (2006.01)
- F02D 41/14 (2006.01)
- F02D 35/02 (2006.01)
- F02D 41/22 (2006.01)

(52) U.S. Cl.
CPC ......... *F02D 35/028* (2013.01); *F02D 41/006* (2013.01); *F02D 41/0057* (2013.01); *F02D 41/1498* (2013.01); *F02D 41/2454* (2013.01); *F02D 41/3035* (2013.01); *F02D 41/3041* (2013.01); *F02D 41/402* (2013.01); *F02D 41/0087* (2013.01); *F02D 2041/0017* (2013.01); *F02D 2041/223* (2013.01)

(56) References Cited

U.S. PATENT DOCUMENTS

| | | | |
|---|---|---|---|
| 2014/0026852 A1 | 1/2014 | Jiang et al. | |
| 2014/0172280 A1* | 6/2014 | Ogata | G01H 17/00 701/111 |
| 2015/0114342 A1* | 4/2015 | Iwai | F02M 26/25 123/305 |
| 2018/0328262 A1* | 11/2018 | Iwabuchi | F02D 35/023 |

FOREIGN PATENT DOCUMENTS

| | | |
|---|---|---|
| JP | 2009108778 A | 5/2009 |
| JP | 2013185466 A | 9/2013 |
| JP | 2015057544 A | 3/2015 |
| JP | 2017067009 A | 4/2017 |
| WO | 2011117973 A1 | 9/2011 |
| WO | 2014030319 A1 | 2/2014 |

OTHER PUBLICATIONS

Manofsky, L et al., "The effects of diluent composition on the rates of HCCI and spark assisted compression ignition combustion," Journal of Applied Energy, Mar. 27, 2014, 13 pages.

Song, K et al., "On-Line Optimization of Direct-Injection-Timing for SI-CAI Hybrid Combustion in a PFI-DI Gasoline Engine," SAE International, Apr. 5, 2016, 12 pages.

European Patent Office, Extended European Search Report Issued in Application No. 18204779.5, dated May 8, 2019, Germany, 11 pages.

* cited by examiner

CONTROL DEVICE FOR COMPRESSION-IGNITION ENGINE

TECHNICAL FIELD

The present disclosure relates to a control device for a compression-ignition engine, which executes partial compression-ignition combustion in which a mixture gas within a cylinder is partially combusted by spark-ignition (SI combustion) and then the remaining mixture gas within the cylinder is combusted by self-ignition (CI (Compression Ignition) combustion).

BACKGROUND OF THE DISCLOSURE

Recently, HCCI (Homogeneous-Charge Compression Ignition) combustion in which gasoline fuel mixed with air is combusted by self-ignition inside a sufficiently compressed cylinder has attracted attention. The HCCI combustion is a mode in which a mixture gas combusts at a plurality of positions simultaneously, and thus has a higher combustion speed of the mixture gas than in SI combustion (spark-ignition combustion) which is adopted for general gasoline engines. Therefore, the HCCI combustion is said to be significantly advantageous in terms of thermal efficiency. However, the HCCI combustion has issues such as a combustion start timing of the mixture gas (a timing that the mixture gas self-ignites) greatly varying due to an external factor (e.g., atmospheric temperature) and a control during a transient operation in which an engine load sharply changes is difficult.

Therefore, instead of combusting the entire mixture gas by self-ignition, it is proposed to combust a portion of the mixture gas by spark-ignition using a spark plug. That is, after forcibly combusting a portion of the mixture gas through flame propagation caused by spark-ignition (SI combustion), the remaining mixture gas is combusted by self-ignition (CI combustion). Hereinafter, such combustion is referred to as "partial compression-ignition combustion."

For example, JP2009-108778A discloses an engine adopting a similar concept to the partial compression-ignition combustion. This engine causes flame propagation combustion by spark-igniting a stratified mixture gas which is formed around a spark plug by a supplementary fuel injection, and then performs a main fuel injection inside a cylinder warmed up by an effect of the flame propagation combustion, so as to combust through self-ignition the fuel injected in the main fuel injection.

Although the engine of JP2009-108778A can stimulate the CI combustion by the spark ignition using the spark plug, a state of a flame core (the size of the flame core and a flame propagation speed) formed immediately after the spark ignition is considered to vary to some extent due to an environment inside the cylinder. If the variation in the flame core formation state becomes large, the switching timing from the SI combustion to the CI combustion (a start timing of the CI combustion) greatly shifts either to the advancing or retarding side from a target timing and the combustion may become unstable. When such unstable combustion continues, vibration, etc. in the engine increases and marketability of the engine drops.

SUMMARY OF THE DISCLOSURE

The present disclosure is made in view of the above situations and aims to provide a control device for a compression-ignition engine, which suitably secures combustion stability while improving thermal efficiency in partial compression-ignition combustion as much as possible.

In order to solve the problem, according to the one aspect of the present disclosure, a control device for a compression-ignition engine in which partial compression-ignition combustion including spark ignition (SI) combustion performed by combusting a portion of a mixture gas inside a cylinder by spark-ignition followed by compression ignition (CI) combustion performed by causing the remaining mixture gas inside the cylinder to self-ignite is executed at least within a part of an operating range of the engine is provided, which includes a detector configured to detect a given parameter that changes as combustion progresses inside the cylinder, an A/F (air-fuel ratio) controller configured to change an air-fuel ratio of air to fuel introduced into the cylinder, and a combustion controller configured to determine combustion stability based on the detected parameter of the detector and control the A/F controller to reduce the air-fuel ratio when it is confirmed during the partial compression-ignition combustion that the combustion stability is low.

According to this configuration, when it is confirmed during the partial compression-ignition combustion that the combustion stability is low, the A/F controller is controlled to reduce the air-fuel ratio (A/F) inside the cylinder. Accordingly, a rich fuel environment is formed inside the cylinder which stimulates a formation of flame core after the spark ignition. Thus, a sufficient size of flame core is stably formed and, as a result, the stability of the partial compression-ignition combustion is improved.

In other words, since the high air-fuel ratio is maintained unless the combustion stability drops, a period of the partial compression-ignition combustion is performed in a lean fuel environment, which is advantageous in terms of thermal efficiency, is secured as long as possible, and fuel efficiency of the engine is effectively improved.

The combustion controller may identify based on the detected parameter of the detector a given mass combustion timing at which a given mass ratio of part of fuel supplied to the cylinder in one combustion cycle combusts, and determine the combustion stability based on the identified given mass combustion timing.

According to this configuration, the combustion stability can appropriately be determined based on the given mass combustion timing which changes according to a change in a combustion speed of the mixture gas.

The combustion controller may identify a first mass combustion timing at which a given first mass ratio of fuel combusts and a second mass combustion timing at which a second mass ratio that is higher than the first mass ratio combusts, and determine the combustion stability based on a variation in combustion speed between cycles calculated based on the first and second mass combustion timings.

According to this configuration, the combustion stability can appropriately be determined based on the variation in the combustion speed between cycles.

The combustion controller may select, as a combustion mode of the partial compression-ignition combustion, one of a first mode in which the partial compression-ignition combustion is performed in an environment in which the air-fuel ratio is higher than a stoichiometric air-fuel ratio and a second mode in which the partial compression-ignition combustion is performed in an environment in which a gas-fuel ratio is higher than the stoichiometric air-fuel ratio and the air-fuel ratio is substantially the stoichiometric air-fuel ratio, and when it is confirmed during the partial compression-ignition combustion in the first mode, that the combustion stability is low, the combustion controller may switch the combustion mode from the first mode to the second mode, the gas-fuel ratio being a ratio of a total gas including EGR (exhaust gas recirculation) gas to fuel inside the cylinder.

According to this configuration, when the combustion stability is high, the first mode is selected and the partial compression-ignition combustion is performed in the lean fuel environment in which the air-fuel ratio (A/F) inside the cylinder is high. On the other hand, when the combustion stability drops while the first mode is selected, the combustion mode is switched from the first mode to the second mode and the partial compression-ignition combustion is performed in relatively rich fuel environment in which the air-fuel ratio is low. Thus, while the partial compression-ignition combustion in the first mode with high thermal efficiency is performed basically, when the combustion stability drops during the first mode selected, the combustion mode is switched to the second mode so as to promptly recover the combustion stability.

The combustion controller may control a timing of the spark ignition so that a combustion center of gravity of the partial compression-ignition combustion in the first mode and a combustion center of gravity of the partial compression-ignition combustion in the second mode are located at the same position when an engine speed and an engine load are the same in the first mode and the second mode.

According to this configuration, since the combustion center of gravity does not largely deviate even when the combustion mode is switched between the first mode and the second mode, a change in torque when switching the mode (a difference in output torque before and after switching) is reduced, and a smooth mode switching which is not easily perceived by a passenger is achieved.

The combustion controller may identify a start timing that is a start timing of the CI combustion based on the detected parameter of the detector and determine the combustion stability based on a variation in the start timing between cycles.

According to this configuration, the combustion stability can appropriately be determined based on the variation in the CI combustion start timing.

The detector may be an in-cylinder pressure sensor configured to detect pressure inside the cylinder as the parameter.

According to this configuration, the combustion stability can appropriately be determined by using the detection value of the in-cylinder pressure sensor.

BRIEF DESCRIPTION OF THE DRAWINGS

FIGS. 5A to 5C are operation maps illustrating a difference in control according to a progression of a warm-up of the engine and an engine speed and an engine load, in which FIG. 5A is a first operation map used in a warmed-up state, FIG. 5B is a second operation map used in a partially warmed-up state, and FIG. 5C is a third operation map used in a cold state.

DETAILED DESCRIPTION OF THE DISCLOSURE (1) Overall Configuration of Engine

Figure 1:
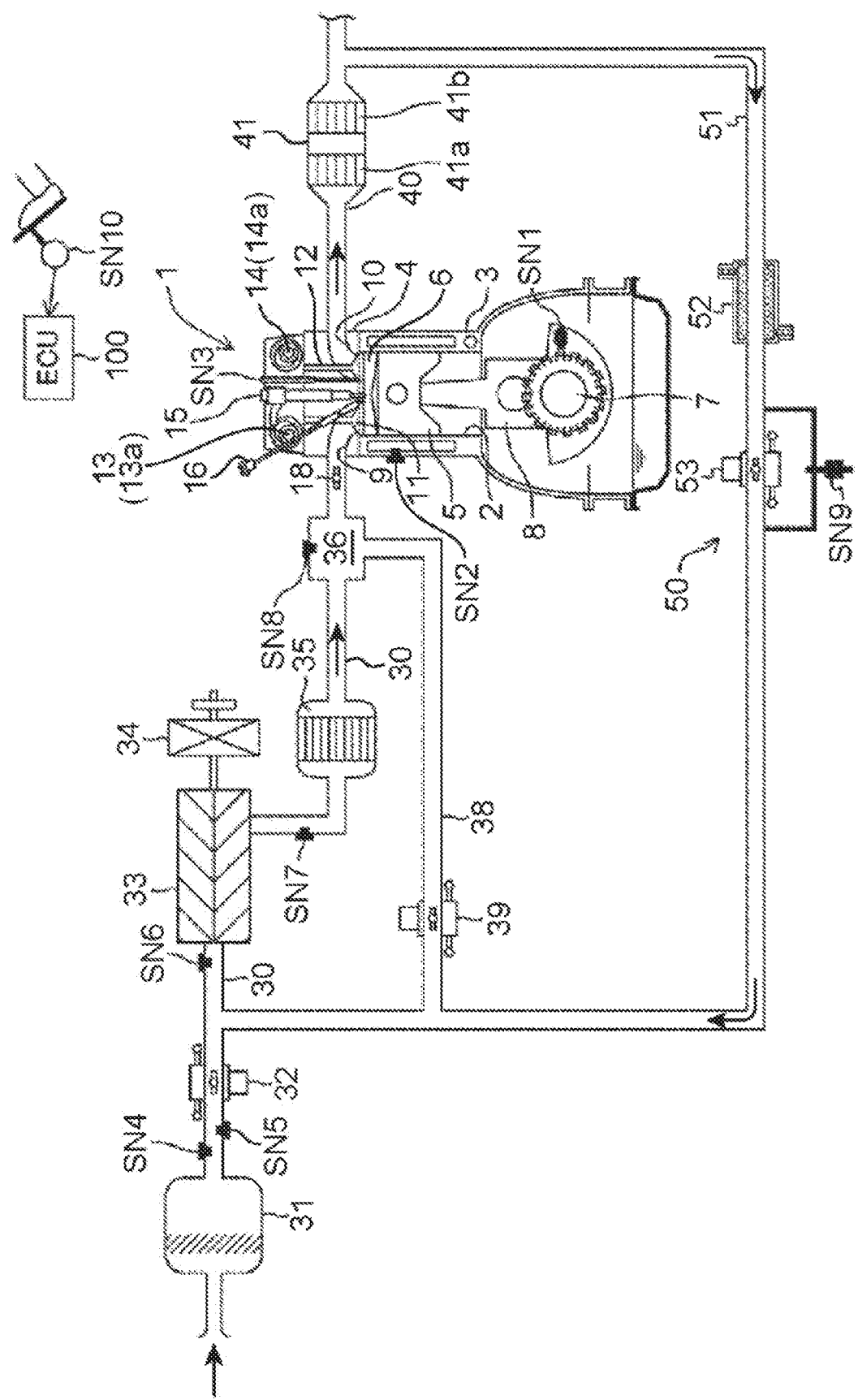
FIG. 1 is a system diagram schematically illustrating an overall configuration of a compression-ignition engine according to one embodiment of the present disclosure.
Figure 2:
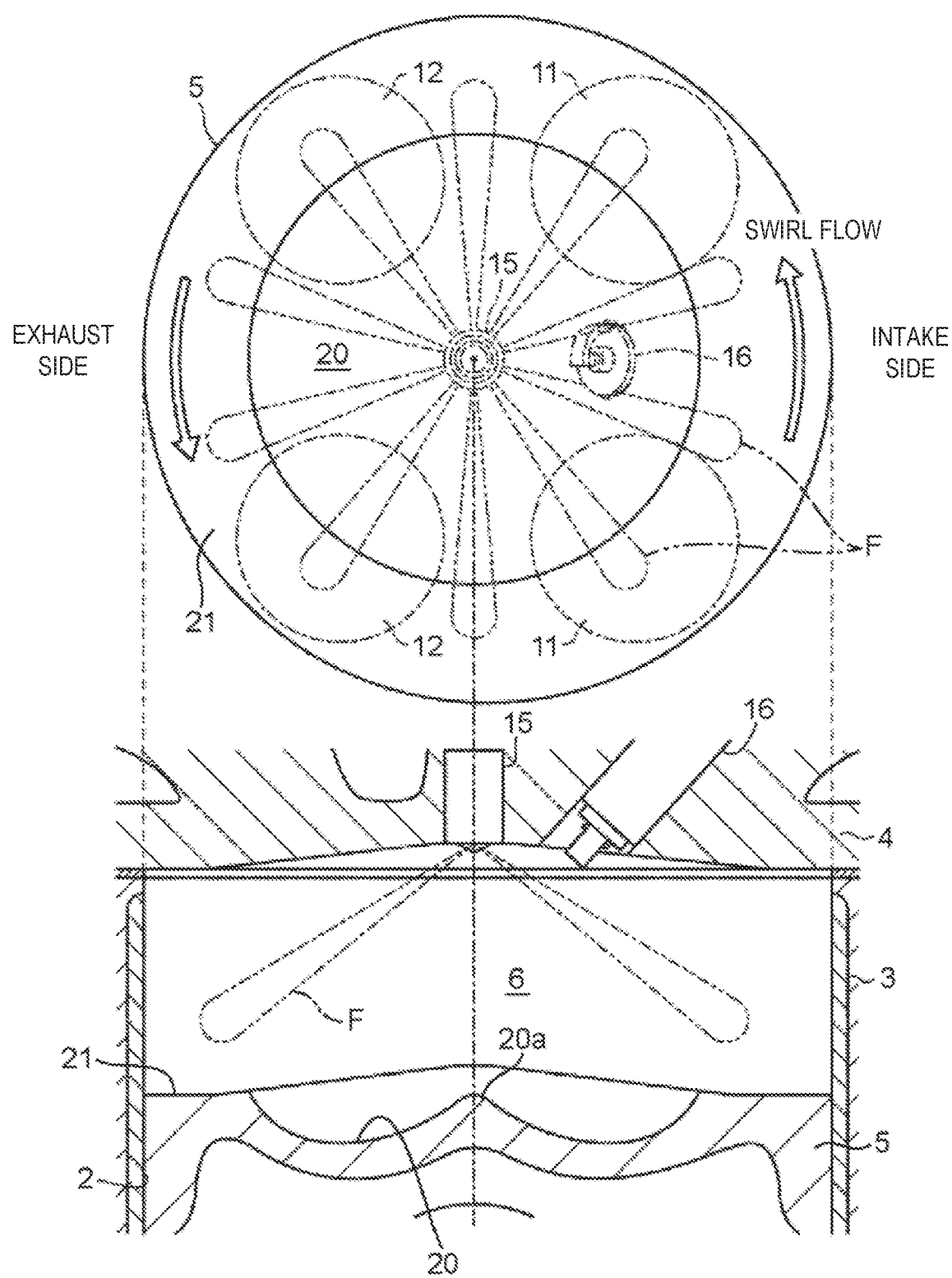
FIG. 2 shows diagrams illustrating a cross-sectional view of an engine body and a plan view of a piston.

FIGS. 1 and 2 are diagrams illustrating a suitable embodiment of a compression-ignition engine (hereinafter, simply referred to as "the engine") to which a control device of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an EGR device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and a fuel containing gasoline as a main component is injected into the combustion chamber 6 by an injector 15 (described later). Further, the supplied fuel is combusted while being mixed with air in the combustion chamber 6, and expansion force caused by this combustion pushes down the piston 5 and thus it reciprocates in up-and-down directions of the cylinder. Note that the fuel injected into the combustion chamber 6 may be any fuel as long as it contains gasoline as a main component and, for example, it may contain a subcomponent, such as bioethanol, in addition to gasoline.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) with the volume of the combustion chamber 6 when the piston 5 is at a bottom dead center (BDC), is set between 13:1 and 30:1 as a suitable value for SPCCI combustion (partial compression-ignition combustion) described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle of the crankshaft 7 (crank angle) and a rotational speed of the crankshaft 7 (engine speed), and a water temperature sensor SN2 which detects a temperature of a coolant flowing through inside the cylinder block 3 and the cylinder head 4 (engine water temperature).

The cylinder head 4 is formed with an intake port 9 and an exhaust port 10 which open into the combustion chamber 6, and provided with an intake valve 11 which opens and closes the intake port 9, and an exhaust valve 12 which opens and closes the exhaust port 10. Note that as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B. A total of two intake valves 11 are provided so as to open and close the first and second intake ports 9A and 9B, respectively, and a total of two exhaust valves 12 are provided so as to open and close the first and second exhaust ports 10A and 10B, respectively.

Figure 3:
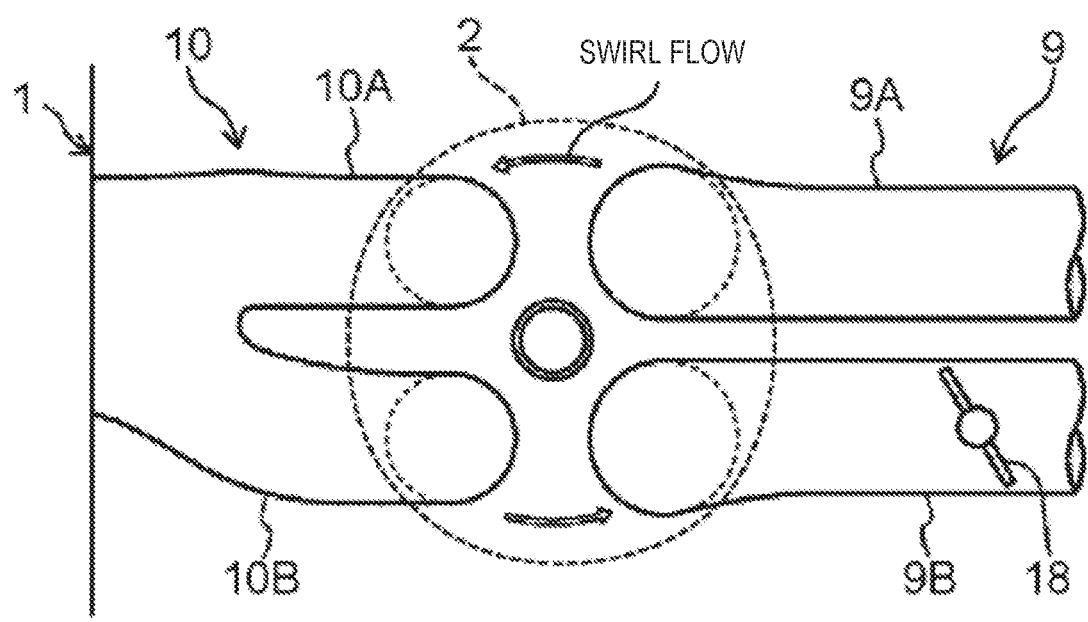
FIG. 3 is a schematic plan view illustrating a structure of a cylinder and intake and exhaust systems in the vicinity thereof.

As illustrated in FIG. 3, a swirl valve 18 openable and closable of the second intake port 9B is provided therein. The swirl valve 18 is only provided in the second intake port 9B, and not provided in the first intake port 9A. When such a swirl valve 18 is driven in the closing direction, since a rate of intake air flowing into the combustion chamber 6 from the first intake port 9A increases, a circling flow circling around an axial line of the cylinder (i.e., swirl flow) is enhanced. Conversely, driving the swirl valve 18 in the opening direction weakens the swirl flow. Note that the intake port 9 of this embodiment is a tumble port formable of a tumble flow. Therefore, the swirl flow formed when closing the swirl valve 18 is an inclined swirl flow mixed with the tumble flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake VVT 13a changeable of at least an open timing of the intake valve 11. Similarly, the valve operating mechanism 14 for the exhaust valve 12 is built therein with an exhaust VVT 14a changeable of at least a close timing of the exhaust valve 12. By controlling the intake VVT 13a and the exhaust VVT 14a, in this embodiment, a valve overlap period in which both the intake and exhaust valves 11 and 12 are opened over TDC of exhaust stroke is adjusted, and by adjusting the valve overlap period, an amount of burned gas remaining in the combustion chamber 6 (internal EGR gas) is adjusted. Note that the intake VVT 13a (exhaust VVT 14a) may be a variable mechanism which changes only the open timing (close timing) while fixing the close timing (open timing) of the intake valve 11 (exhaust valve 12), or a phase-variable mechanism which simultaneously changes the open timing and the close timing of the intake valve 11 (exhaust valve 12). The intake and exhaust VVTs 13a and 14a correspond to one example of a "A/F controller."

The cylinder head 4 is provided with the injector 15 which injects the fuel (mainly gasoline) into the combustion chamber 6, and a spark plug 16 which ignites the mixture gas containing the fuel injected into the combustion chamber 6 from the injector 15 and air introduced into the combustion chamber 6. The cylinder head 4 is further provided with an in-cylinder pressure sensor SN3 which detects pressure of the combustion chamber 6 (hereinafter, also referred to as "in-cylinder pressure"). Note that the in-cylinder pressure sensor SN3 corresponds to a "detector."

As illustrated in FIG. 2, on a crown surface of the piston 5, a cavity 20 is formed by denting a relatively wide area of the piston 5, including a center part thereof, to the opposite side from the cylinder head 4 (downward). A center section of the cavity 20 is formed with a bulge portion 20a having a substantially conical shape, bulging relatively upward, and both sides of the cavity 20 over the bulge portion 20a in radial directions respectively form a bowl-shaped recessed portion in cross section. In other words, the cavity 20 is a recessed portion having a donut shape in plan view, formed to surround the bulge portion 20a. Further, a section of the crown surface of the piston 5 radially outward of the cavity 20 is a squish portion 21 comprised of an annular flat surface.

The injector 15 is a multi-port injector having a plurality of nozzle ports at its tip portion, and the fuel is injected radially from the plurality of nozzle ports ("F" in FIG. 2 indicates fuel spray injected from the respective nozzle ports). The injector 15 is provided so that its tip portion opposes to the center portion (bulge portion 20a) of the crown surface of the piston 5.

The spark plug 16 is disposed at a somewhat offset position to the intake side with respect to the injector 15. The tip portion (electrode portion) of the spark plug 16 is set at a position overlapping with the cavity 20 in the plan view.

As illustrated in FIG. 1, the intake passage 30 is connected to one side surface of the cylinder head 4 to communicate with the intake port 9. Air (fresh air) taken in from an upstream end of the intake passage 30 is introduced into the combustion chamber 6 through the intake passage 30 and the intake port 9.

In the intake passage 30, an air cleaner 31 which removes foreign matters within the intake air, a throttle valve 32 which adjusts a flow rate of intake air, a booster 33 which pumps the intake air while compressing it, an intercooler 35 which cools the intake air compressed by the booster 33, and a surge tank 36 are provided in order from the upstream side. Note that the throttle valve 32 corresponds to one example of an "A/F controller."

An airflow sensor SN4 which detects the flow rate of intake air, first and second intake air temperature sensors SN5 and SN7 which detect a temperature of the intake air, and first and second intake air pressure sensors SN6 and SN8 which detect the pressure of the intake air are provided in various parts of the intake passage 30. The airflow sensor SN4 and the first intake air temperature sensor SN5 are provided in a portion of the intake passage 30 between the air cleaner 31 and the throttle valve 32, and detect the flow rate and the temperature of the intake air passing through this portion. The first intake air pressure sensor SN6 is provided in a portion of the intake passage 30 between the throttle valve 32 and the booster 33 (downstream of a connection port of an EGR passage 51 described later), and detects the pressure of the intake air passing through this portion. The second intake air temperature sensor SN7 is provided in a portion of the intake passage 30 between the booster 33 and the intercooler 35, and detects the temperature of intake air passing through this portion. The second intake air pressure sensor SN8 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lyshoum type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, a driving force is transmitted from the engine body 1 to the booster 33, and boosting by the booster 33 is performed. On the other hand, when the electromagnetic clutch 34 is disengaged, the transmission of the driving force is interrupted, and the boosting by the booster 33 is stopped.

A bypass passage 38 which bypasses the booster 33 is provided in the intake passage 30. The bypass passage 38 connects the surge tank 36 to the EGR passage 51 described later. A bypass valve 39 is provided in the bypass passage 38.

The exhaust passage 40 is connected to the other side surface of the cylinder head 4 so as to communicate with the exhaust port 10. Burned gas (exhaust gas) generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components (HC, CO and $NO_x$) contained within the exhaust gas flowing through the exhaust passage 40, and a GPF (gasoline-particulate filter) 41b which captures particulate matter (PM) contained within the exhaust gas. Note that another catalytic converter built therein with a suitable catalyst, such as a three-way catalyst or a $NO_x$ catalyst, may be added downstream of the catalytic converter 41.

The EGR device 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 (external EGR gas) by heat exchange. The EGR valve 53 is provided in the EGR passage 51 downstream of the EGR cooler 52 (the side close to the intake passage 30), and adjusts a flow rate of the exhaust gas flowing through the EGR passage 51. The EGR valve 53 corresponds to one example of an "A/F controller."

A pressure difference sensor SN9 which detects a difference between pressure upstream of the EGR valve 53 and pressure downstream thereof is provided in the EGR passage 51.

(2) Control System

Figure 4:
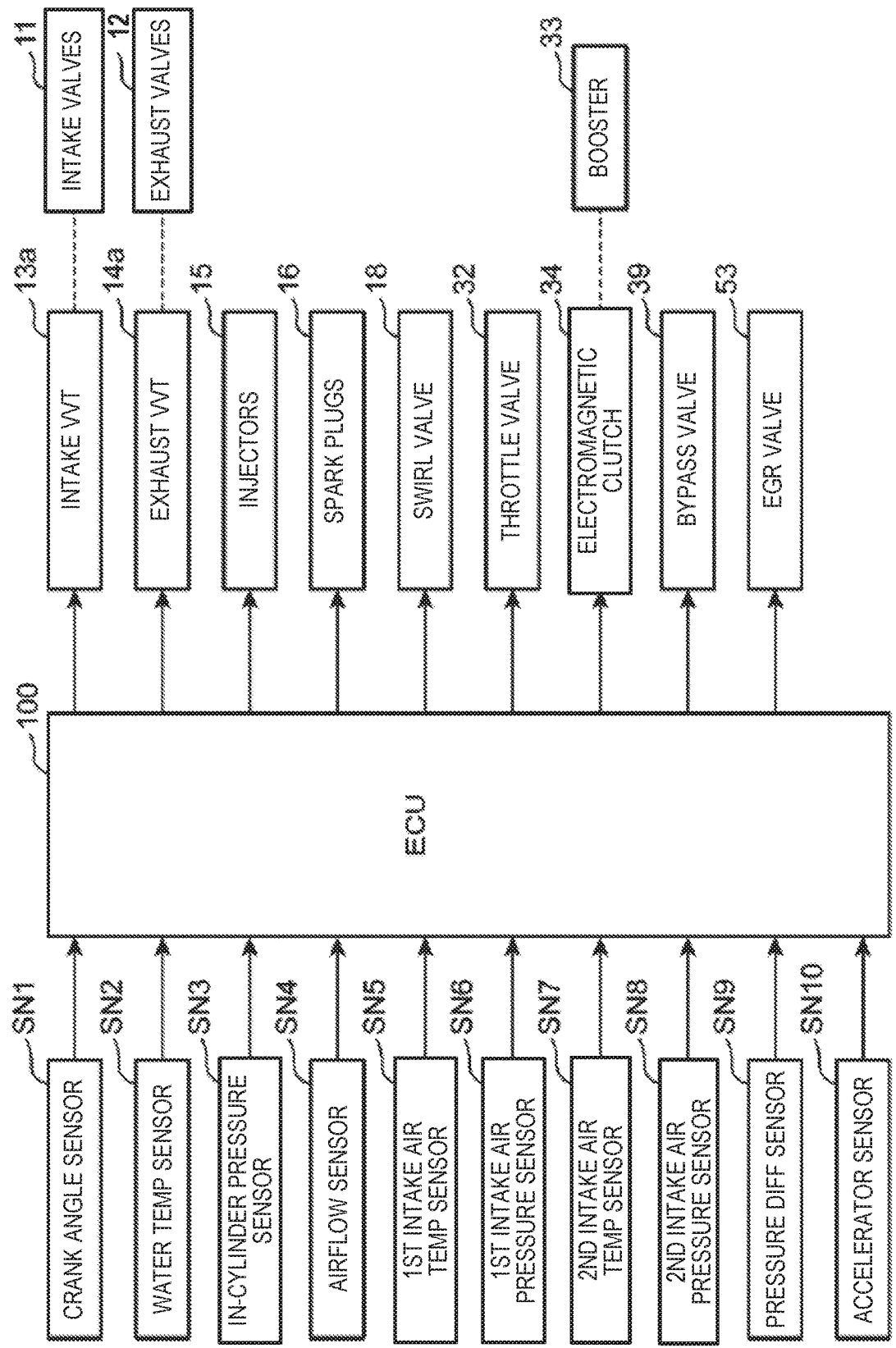
FIG. 4 is a block diagram illustrating a control system of the engine.

FIG. 4 is a block diagram illustrating a control system of the engine. An ECU (electronic control unit) 100 illustrated in FIG. 4 is a microprocessor which comprehensively controls the engine, and comprised of a well-known processor, ROM, RAM, etc.

The ECU 100 receives detection signals from various sensors. For example, the ECU 100 is electrically connected to the crank angle sensor SN1, the water temperature sensor SN2, the in-cylinder pressure sensor SN3, the airflow sensor SN4, the first and second intake air temperature sensors SN5 and SN7, the first and second intake air pressure sensors SN6 and SN8, and the pressure difference sensor SN9, which are described above. The ECU 100 sequentially receives the information detected by these sensors (i.e., the crank angle, the engine speed, the engine water temperature, the in-cylinder pressure, the intake air flow rate, the intake air temperatures, the intake air pressures, the difference in pressure between the upstream and downstream sides of the EGR valve 53, etc.).

Further, an accelerator sensor SN10 which detects an opening of an accelerator pedal controlled by a vehicle driver driving the vehicle is provided in the vehicle, and a detection signal from the accelerator sensor SN10 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on various calculation results.

Note that the ECU 100 as described above corresponds to a "combustion controller."

(3) Control According to Operating State

Figure 5A:
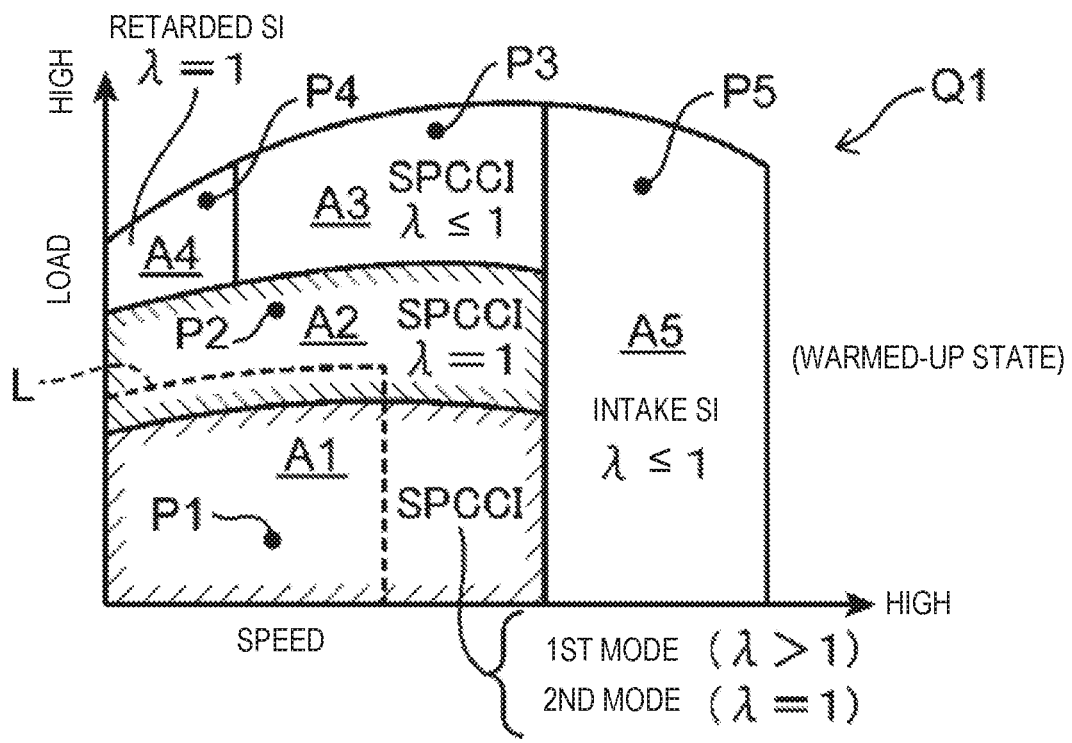
Figure 5B:
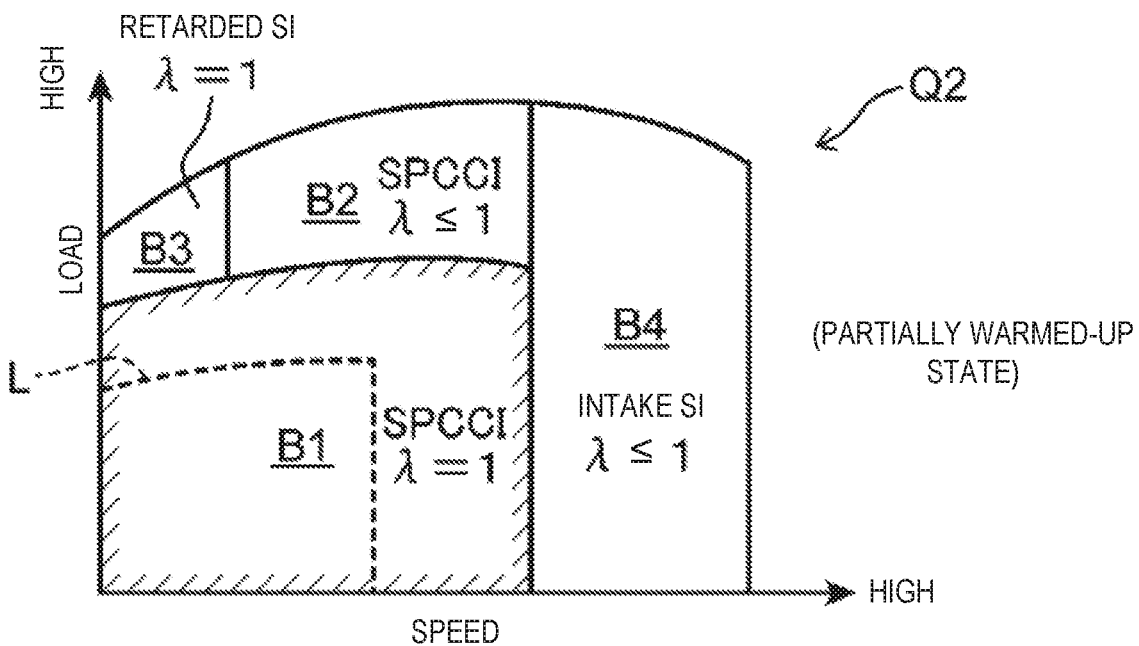
Figure 5C:
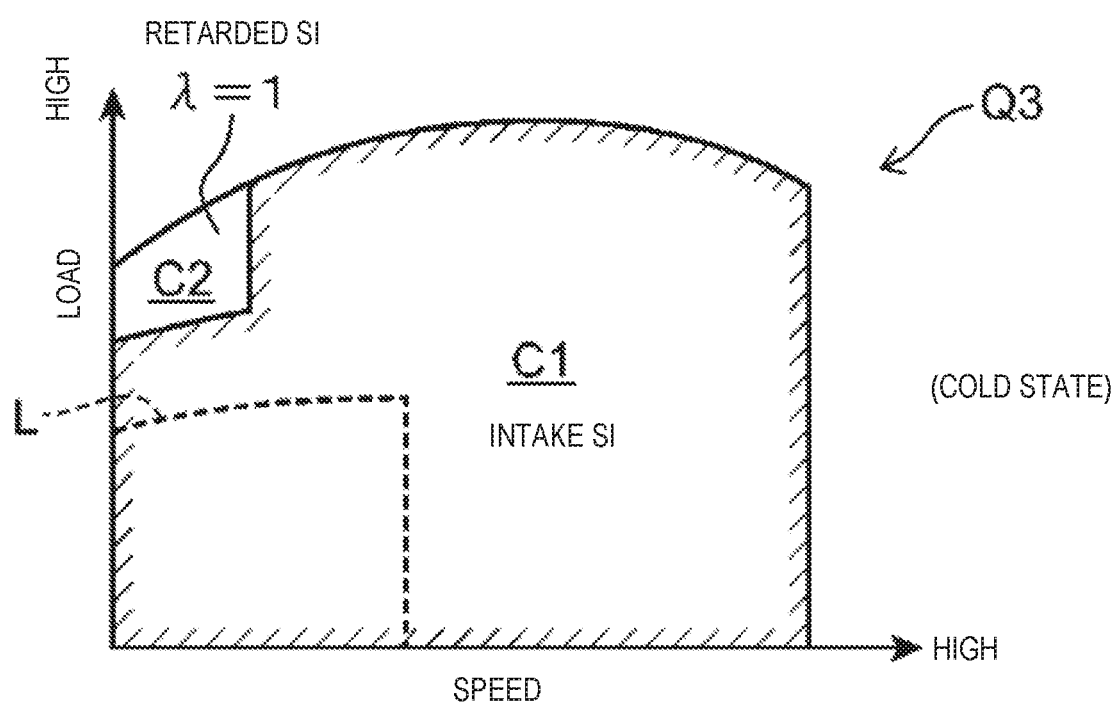

FIGS. 5A to 5C are operation maps illustrating a difference in control according to a progression of a warm-up of the engine and the engine speed and load. As illustrated in FIGS. 5A to 5C, in this embodiment, different operation maps Q1 to Q3 are prepared corresponding to three stages including a warmed-up state where the warm-up of the engine is completed, a partially warmed-up state where the engine is in process of warming up, and a cold state where the engine is not warmed up. Hereinafter, the operation map Q1 used in the warmed-up state is referred to as the first operation map, the operation map Q2 used in the partially warmed-up state is referred to as the second operation map, and the operation map Q3 used in the cold state is referred to as the third operation map.

The first operation map Q1 for the warmed-up state (FIG. 5A) includes five operating ranges A1 to A5 in which the combustion mode is different, the second operation map Q2 for the partially warmed-up state (FIG. 5B) includes four operating ranges B1 to B4 in which the combustion mode is different, and the third operation map Q3 for the cold state (FIG. 5C) includes two operating ranges C1 and C2 in which the combustion mode is different. The details of the combustion mode in each of these operating ranges will be described later.

Figure 6:
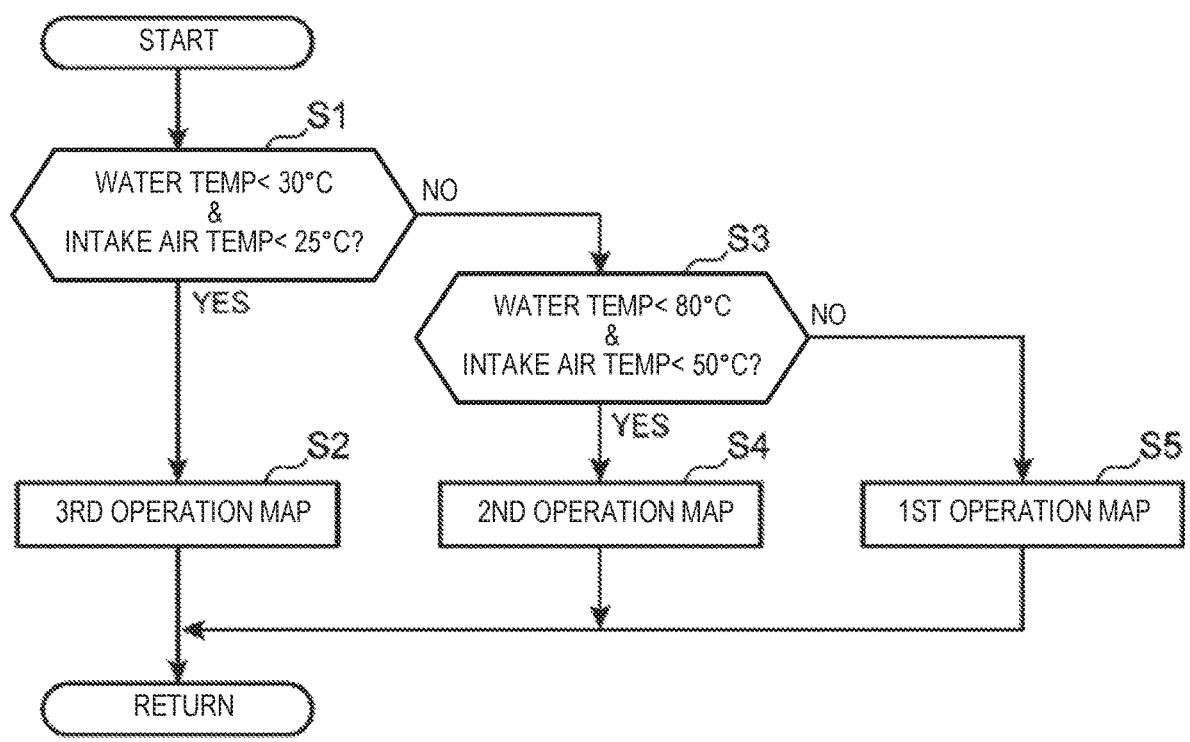
FIG. 6 is a flowchart illustrating a procedure for selecting a suitable map from the first to third operation maps.

FIG. 6 is a flowchart illustrating a procedure for selecting a suitable map from the first to third operation maps Q1 to Q3. Once the control illustrated in this flowchart is started, at S1, the ECU 100 determines whether (i) the engine water temperature is below 30° C. and (ii) the intake air temperature is below 25° C. are both satisfied, based on the engine water temperature detected by the water temperature sensor SN2 and the intake air temperature detected by the second intake air temperature sensor SN7.

If S1 is YES and it is confirmed that (i) and (ii) are satisfied, i.e., both "engine water temperature<30° C." and "intake air temperature<25° C." are satisfied and the engine is in the cold state, the ECU 100 shifts to S2 to determine the third operation map Q3 illustrated in FIG. 5C as the operation map to be used.

On the other hand, if S1 is NO and it is confirmed that at least one of (i) and (ii) is not satisfied, the ECU 100 shifts to S3 to determine whether (iii) the engine water temperature is below 80° C. and (iv) the intake air temperature is below 50° C. are both satisfied, based on the engine water temperature detected by the water temperature sensor SN2 and the intake air temperature detected by the second intake air temperature sensor SN7.

If S3 is YES and it is confirmed that (iii) and (iv) are satisfied, i.e., at least one of "engine water temperature≥30° C." and "intake air temperature≥25° C." is satisfied, and both "engine water temperature≤80° C." and "intake air temperature<50° C." are satisfied, which means that the engine is in the partially warmed-up state, the ECU 100 shifts to S4 to determine the second operation map Q2 illustrated in FIG. 5B as the operation map to be used.

If S3 is NO and it is confirmed that at least one of (iii) and (iv) is not satisfied, i.e., at least one of "engine water temperature≥80° C." and "intake air temperature≥50° C." is satisfied, which means that the engine is in the warmed-up state (warm-up completed state), the ECU 100 shifts to S5 to determine the first operation map Q1 illustrated in FIG. 5A as the operation map to be used.

Next, details of controls (a difference in combustion control according to the engine speed/load) defined by the operation maps Q1 to Q3 in the cold state, the partially warmed-up state, and the warmed-up state are described, respectively.

(a) Control in Warmed-Up State

First, a combustion control in the warmed-up state of the engine is described with reference to the first operation map Q1 (FIG. 5A). When the five operating ranges included in the first operation map Q1 are a first range A1, a second range A2, a third range A3, a fourth range A4 and a fifth range A5, the first range A1 is a low-/medium-speed and low-load range in which the engine load is low (including zero load) and the engine speed is low or medium, the second range A2 is a low-/medium-speed and medium-load range in which the engine load is higher than the first range A1, the fourth range A4 is a low-speed and high-load range in which the engine load is higher than the second range A2 and the engine speed is low, the third range A3 is a medium-speed and high-load range in which the engine speed is higher than the fourth range A4, and the fifth range A5 is a high-speed range in which the engine speed is higher than the first to fourth ranges A1 to A4. Hereinafter, the combustion mode, etc. selected in each operating range will be sequentially described.

(a-1) First Range

Within the first range A1 in which the engine speed is low or medium and the engine load is low, the partial compression-ignition combustion combining the SI combustion and the CI combustion (hereinafter referred to as "SPCCI combustion") is performed. The SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark-ignition performed in an environment immediately before the mixture gas self-ignites, and after the SI combustion, the CI combustion is performed on the rest of the mixture gas in the combustion chamber 6 by self-ignition (by the further increase in temperature and pressure accompanying the SI combustion). Note that "SPCCI" is an abbreviation of "SPark Controlled Compression Ignition."

Figure 7:
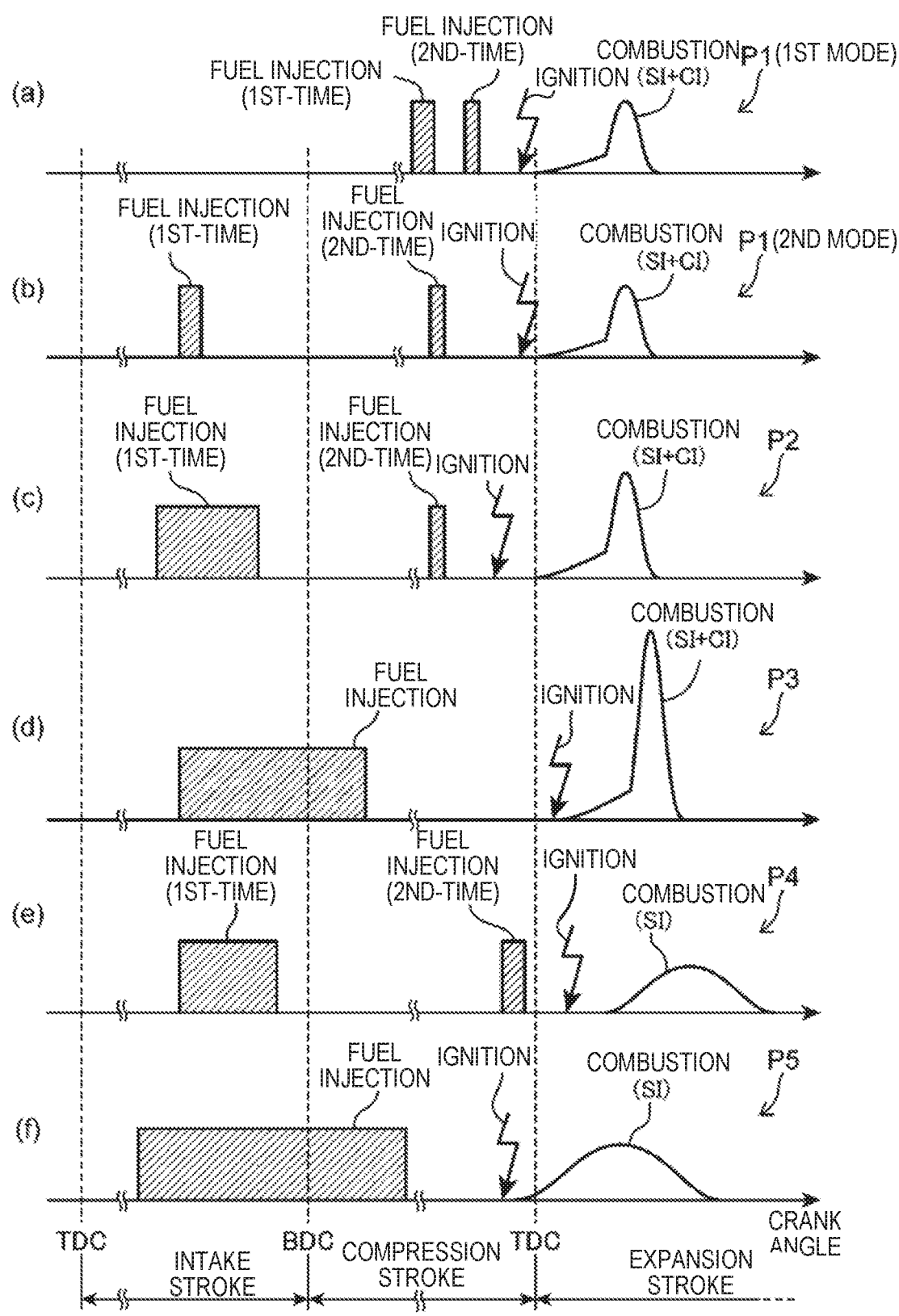
FIG. 7 shows time charts schematically illustrating a combustion control executed in respective ranges of the first operation map.
Figure 8:
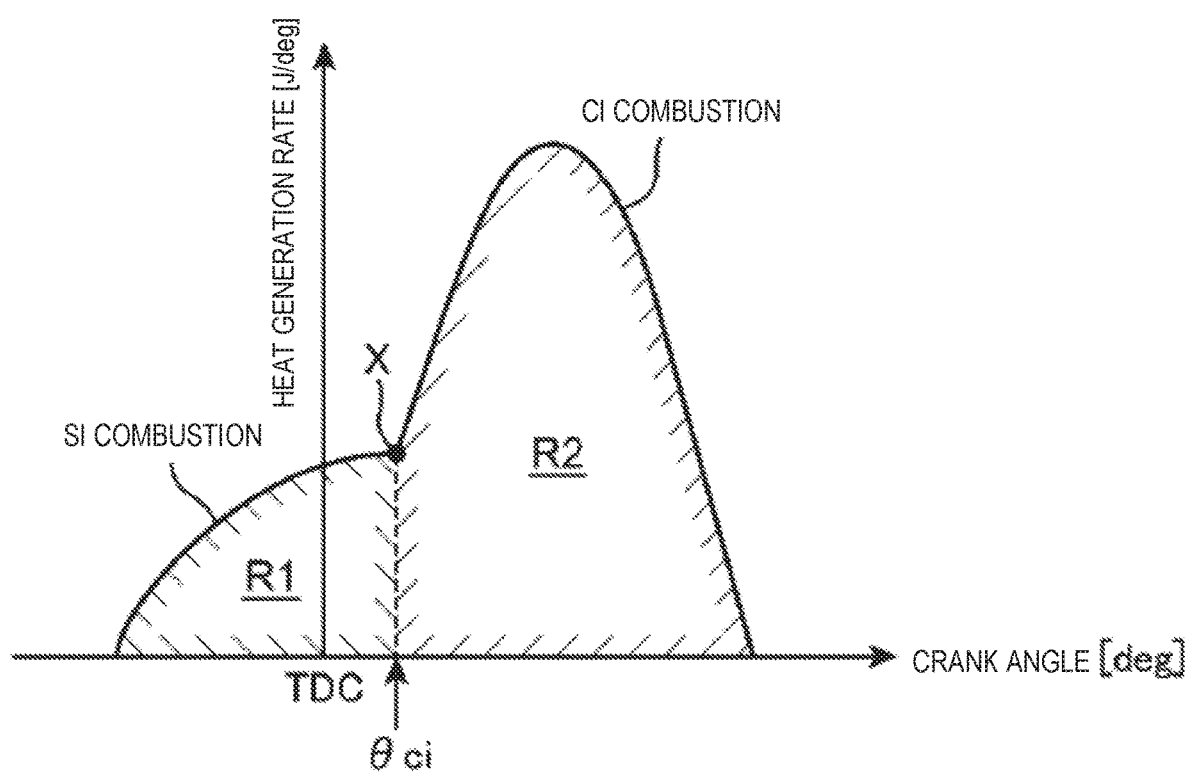
FIG. 8 is a chart illustrating a waveform of a heat generation rate in SPCCI combustion (partial compression-ignition combustion).

The SPCCI combustion has a characteristic that the heat generation in the CI combustion is faster than that in the SI combustion. For example, as illustrated in FIG. 7 or 8 described later, a waveform of a heat generation rate caused by the SPCCI combustion has a shape in which a rising slope in an early stage of the combustion which corresponds to the SI combustion is gentler than a rising slope caused corresponding to the CI combustion occurring subsequently. In other words, the waveform of the heat generation rate caused by the SPCCI combustion is formed to have a first heat generation rate portion formed by the SI combustion and having a relatively gentle rising slope, and a second heat generation rate portion formed by the CI combustion and having a relatively sharp rising slope, which are next to each other in this order. Further, corresponding to the tendency of such a heat generation rate, in the SPCCI combustion, a pressure increase rate (dp/dθ) inside the combustion chamber 6 caused by the SI combustion is lower than that in the CI combustion.

When the temperature and pressure inside the combustion chamber 6 rise due to the SI combustion, the unburned mixture gas self-ignites and the CI combustion starts. As illustrated in FIG. 7 or 8 described later, the slope of the waveform of the heat generation rate changes from gentle to sharp at the timing of self-ignition (that is, the timing when the CI combustion starts). That is, the waveform of the heat generation rate caused by the SPCCI combustion has a flection point at a timing when the CI combustion starts (labeled with an "X" in FIG. 8).

After the CI combustion starts, the SI combustion and the CI combustion are performed in parallel. In the CI combustion, since the combustion speed of the mixture gas is higher than that in the SI combustion, the heat generation rate becomes relatively high. However, since the CI combustion is performed after TDC of compression stroke (CTDC), the slope of the waveform of the heat generation rate does not become excessive. That is, after CTDC, since the motoring pressure decreases due to the piston 5 descending, the rise of the heat generation rate is prevented, which avoids excessive dp/dθ in the CI combustion. In the SPCCI combustion, due to the CI combustion being performed after the SI combustion as described above, it is unlikely for dp/dθ which is an index of combustion noise to become excessive, and the combustion noise is reduced compared to performing the CI combustion alone (in the case where the CI combustion is performed on all the fuel).

The SPCCI combustion ends as the CI combustion finishes. Since the combustion speed of the CI combustion is faster than that of the SI combustion, the combustion end timing is advanced compared to performing the SI combustion alone (in the case where the SI combustion is performed on all the fuel). In other words, the SPCCI combustion brings the combustion end timing closer to CTDC, on the expansion stroke. Thus, the SPCCI combustion improves the fuel efficiency compared to the SI combustion alone.

Within the first range A1, two kinds of modes, a first mode and a second mode, are prepared as specific modes of the SPCCI combustion. The first mode is a mode in which the SPCCI combustion is performed while setting an air-fuel ratio (A/F) which is a mass ratio between air (fresh air) inside the combustion chamber 6 and the fuel larger than the stoichiometric air-fuel ratio (14.7:1), and the second mode is a mode in which the SPCCI combustion is performed while setting the air-fuel ratio to or near the stoichiometric air-fuel ratio. In other words, in the first mode, the SPCCI combustion is performed in a lean air-fuel ratio environment in which an excess air ratio λ (a value obtained by dividing an actual air-fuel ratio by the stoichiometric air-fuel ratio) is higher than 1, and in the second mode, the SPCCI combustion is performed in a stoichiometric environment in which the excess air ratio λ is at or near 1. For example, the excess air ratio λ is set to 2 or higher in the first mode, and the excess air ratio λ is set to 1±0.2 in the second mode. Within the first range A1, the first mode (λ>1) is basically selected, and when reduction of a combustion stability is detected while operating in the first mode, the combustion mode is temporarily switched to the second mode (λ=1). Note that the details of the mode switch according to the combustion stability will be described later.

In order to achieve the SPCCI combustion in the first/second mode as described above, within the first range A1, the various components of the engine are controlled by the ECU 100 as follows.

The injector 15 performs the fuel injection in a different form depending on which the selected mode is, the first or second mode. Specifically, when the first mode is selected, the injector 15 injects all or majority of the fuel for one combustion cycle, during the compression stroke. For example, when the engine is operated at an operation point P1 within the first range A1 and the first mode is selected, the injector 15 injects the fuel separately in two times from an intermediate stage to a final stage of the compression stroke, as illustrated in the chart (a) of FIG. 7. On the other hand, when the second mode is selected, the injector 15 advances the injection timing of at least a portion of the fuel to intake stroke. For example, when the engine is operated at the operation point P1 and the second mode is selected, as illustrated in the chart (b) of FIG. 7, the injector 15 performs the first fuel injection on the intake stroke and the second fuel injection on the compression stroke.

The spark plug 16 ignites the mixture gas near CTDC. For example, at the operation point P1, the spark plug 16 ignites the mixture gas at a slightly advanced timing from CTDC. This ignition triggers the SPCCI combustion, a portion of the mixture gas in the combustion chamber 6 is combusted through flame propagation (SI combustion), and then the rest of the mixture gas is combusted by self-ignition (CI combustion).

The booster 33 is controlled to be OFF within a boost line L illustrated in the first operation map Q1 (FIG. 5A), and be ON outside the boost line L. Inside the boost line L where the booster 33 is OFF, i.e., at the low engine speed side of the first range A1, the electromagnetic clutch 34 is disengaged to disconnect the booster 33 from the engine body 1 and the bypass valve 39 is fully opened so as to stop boosting by the booster 33. Outside the boost line L where the booster 33 is ON, i.e., at the high engine speed side of the first range A1, the electromagnetic clutch 34 is engaged to connect the booster 33 to the engine body 1 so as to perform boosting by the booster 33. Here, an opening of the bypass valve 39 is controlled so that the pressure in the surge tank 36 (boosting pressure) detected by the second intake air pressure sensor SN8 matches a given target pressure determined for each operating condition (engine speed and engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, that is, the boosting pressure, becomes low. By adjusting the backflow amount of the intake air in this manner, the bypass valve 39 controls the boosting pressure to the target pressure.

The intake VVT 13a and the exhaust VVT 14a set valve operation timings of the intake and exhaust valves 11 and 12 so that internal EGR is performed, i.e., the valve overlap period in which both the intake and exhaust valves 11 and 12 are opened over TDC of the exhaust stroke is sufficiently formed. As a result, the internal EGR which leaves the burned gas inside the combustion chamber 6 is achieved, and the temperature of the combustion chamber 6 (the initial temperature before the compression) is increased.

The throttle valve 32 is opened to an opening corresponding to fully opened when the first mode (λ>1) is selected and closed to a given middle opening when the second mode (λ=1) is selected. By such a control of the throttle valve 32, the air-fuel ratio (A/F) inside the entire combustion chamber 6 is set to between 30:1 and 40:1 in the first mode, and the air-fuel ratio is set to 14.7:1 or near 14.7:1 in the second mode.

An opening of the EGR valve 53 is controlled so that the air-fuel ratio inside the entire combustion chamber 6 becomes a target air-fuel ratio defined for the respective first and second modes. In other words, the EGR valve 53 adjusts the flow rate inside the EGR passage 51 so as to recirculate from the EGR passage 51 to the combustion chamber 6, an amount of gas obtained by subtracting the air amount corresponding to the target air-fuel ratio (A/F=30:1 to 40:1 in the first mode; A/F≈14.7 in the second mode) and the amount of burned gas left in the combustion chamber 6 due to the internal EGR from a total gas amount introduced into the combustion chamber 6, as external EGR gas. Note that within the first range A1, the air-fuel ratio (A/F) is set to or leaner than the stoichiometric air-fuel ratio as described above, and also the EGR gas (external EGR gas and internal EGR gas) is introduced into the combustion chamber 6. Therefore, a gas-fuel ratio (G/F) which is a mass ratio of the total gas to the fuel inside the combustion chamber 6 is lean (above the 14.7:1) in both the first and second modes. Note that since the opening of the throttle valve 32 in the second mode is smaller than that in the first mode, the gas-fuel ratio in the second mode is smaller than the gas-fuel ratio in the first mode. For example, the gas-fuel ratio (G/F) is set to between 35:1 to 45:1 in the first mode is and 18:1 to 25:1 in the second mode.

An opening of the swirl valve 18 is in the fully closed state or narrowed to a small opening close to the fully closed state. As a result, all or majority of the intake air introduced into the combustion chamber 6 is from the first intake port 9A (the intake port on the side where the swirl valve 18 is not provided), thus a strong swirl flow is formed inside the combustion chamber 6. This swirl flow grows during the intake stroke and remains until the middle of the compression stroke. Therefore, for example, when the fuel is injected after an intermediate stage of the compression stroke as during the operation in the first mode illustrated in (a) of FIG. 7 (in the mode in which the SPCCI combustion is performed in the lean air-fuel ratio environment in which λ>1), stratification of the fuel is achieved by the effect of the swirl flow. That is, when the fuel is injected after the intermediate stage of the compression stroke in the presence of the swirl flow, the injected fuel is collected in a center portion of the combustion chamber 6 where the swirl flow is relatively weak. Thus, such concentration difference that the fuel in the center portion of the combustion chamber 6 concentrates more than outside thereof (outer circumferential portion) occurs, and the stratification of the fuel is achieved. For example, when operating in the first mode, the air-fuel ratio in the center portion of the combustion chamber 6 is set to between 20:1 and 30:1 and the air-fuel ratio in an outer circumference portion of the combustion chamber 6 is set to 35:1 or above.

(a-2) Second Range

Within the second range A2 in which the engine speed is low or medium and the engine load is medium, the control for performing the SPCCI combustion of the mixture gas is executed in the environment in which the air-fuel ratio inside the combustion chamber 6 is substantially the stoichiometric air-fuel ratio ($\lambda=1$). For example, in order to achieve the SPCCI combustion in such a stoichiometric environment, within the second range A2, various components of the engine are controlled by the ECU 100 as follows.

The injector 15 injects a portion of the fuel to be injected in one combustion cycle during the intake stroke, and injects the rest of the fuel on the compression stroke. For example, as illustrated in the chart (c) of FIG. 7, at an operation point P2 within the second operating range A2, the injector 15 performs a first (first-time) fuel injection by which a relatively large amount of fuel is injected during the intake stroke and performs a second (second-time) fuel injection by which a smaller amount of fuel than the first fuel injection is injected during the compression stroke.

The spark plug 16 ignites the mixture gas near CTDC. For example, at the operation point P2, the spark plug 16 ignites the mixture gas at a slightly advanced timing from CTDC. This ignition triggers the SPCCI combustion, a portion of the mixture gas inside the combustion chamber 6 is combusted through flame propagation (SI combustion), and then the rest of the mixture gas is combusted by self-ignition (CI combustion).

The booster 33 is controlled to be OFF in a section of the low-load and low-speed range overlapping with the section within the boost line L, and be ON outside this section. When the booster 33 is ON and boosting the intake air, the opening of the bypass valve 39 is controlled so that the pressure inside the surge tank 36 (boosting pressure) matches with the target pressure.

The intake VVT 13a and the exhaust VVT 14a set valve operation timings of the intake and exhaust valves 11 and 12 so that the internal EGR is performable (i.e., so that a given length of valve overlap period is formed). Note that the internal EGR may substantially be stopped on the higher load side within the second range A2.

The throttle valve 32 is fully opened.

The opening of the EGR valve 53 is controlled so that the air-fuel ratio (A/F) in the combustion chamber 6 becomes the stoichiometric air-fuel ratio ($\lambda=1$) or therearound. For example, the EGR valve 53 adjusts the amount of the external gas recirculated through the EGR passage 51 (external EGR gas) so that the excess air ratio $\lambda$ becomes 1±0.2. Note that the gas-fuel ratio (G/F) inside the combustion chamber 6 is set lean.

The opening of the swirl valve 18 is in the fully closed state or narrowed to a small opening close to the fully closed state. Thus, a strong swirl flow is formed inside the combustion chamber 6.

(a-3) Third Range

Within the third range A3, the control for performing the SPCCI combustion of the mixture gas is executed in the environment in which the air-fuel ratio inside the combustion chamber 6 is slightly richer ($\lambda \leq 1$) than the stoichiometric air-fuel ratio. For example, in order to achieve the SPCCI combustion in such a rich environment, within the third range A3, various components of the engine are controlled by the ECU 100 as follows.

The injector 15 injects all or majority of the fuel for one combustion cycle, during the intake stroke. For example, at an operation point P3 within the third range A3, the injector 15 injects the fuel over a continuous period overlapping with a latter half of the intake stroke, more specifically, a continuous period from the latter half of the intake stroke to an initial stage of the compression stroke, as illustrated in the chart (d) of FIG. 7.

The spark plug 16 ignites the mixture gas near CTDC. For example, at the operation point P3, the spark plug 16 ignites the mixture gas at a slightly retarded timing from CTDC.

The booster 33 is controlled to be ON and performs boosting. The boosting pressure here is adjusted by the bypass valve 39.

The intake VVT 13a and the exhaust VVT 14a set valve operation timings of the intake and exhaust valves 11 and 12 so that the internal EGR is substantially stopped.

The throttle valve 32 is fully opened.

The opening of the EGR valve 53 is controlled so that the air-fuel ratio (A/F) in the combustion chamber 6 becomes the stoichiometric air-fuel ratio or slightly richer ($\lambda \leq 1$). For example, the EGR valve 53 adjusts the amount of the exhaust gas recirculated through the EGR passage 51 (external EGR gas) so that the air-fuel ratio becomes between 12:1 and 14:1. Note that near a highest engine load, the EGR valve 53 may be closed to substantially stop the external EGR.

The swirl valve 18 is set to have an intermediate opening which is larger than that within the first and second ranges A1 and A2 but smaller than a largest (full) opening.

(a-4) Fourth Range

Within the fourth range A4 on the low-speed, high-load side, a control is executed in which at least a portion of the fuel is injected in the final stage of the compression stroke and the mixture gas is subjected to the SI combustion. For example, in order to achieve the SI combustion accompanied by such a retarded injection, within the fourth range A4, the various components of the engine are controlled by the ECU 100 as follows.

The injector 15 injects a portion of the fuel to be injected in one combustion cycle during the intake stroke, and injects the rest of the fuel in a final stage of the compression stroke. For example, as illustrated in the chart (e) of FIG. 7, at an operation point P4 within the fourth range A4, the injector 15 performs the first fuel injection in which a relatively large amount of fuel is injected during the intake stroke and performs the second fuel injection in which a smaller amount of fuel than the first fuel injection is injected in the final stage of the compression stroke (immediately before CTDC).

The spark plug 16 ignites the mixture gas at a relatively retarded timing, for example 5° C. A to 20° C. A from CTDC. Further, this ignition triggers the SI combustion, and all the mixture gas in the combustion chamber 6 combusts through flame propagation. Note that the reason why the ignition timing within the fourth range A4 is retarded as described above is to prevent abnormal combustion, such as knocking and pre-ignition. However, within the fourth range A4, the second fuel injection is set to be performed in the final stage of the compression stroke (immediately before CTDC), which is considerably late, therefore, even with the ignition timing retarded as described above, the combustion speed after the ignition (flame propagation speed) is relatively fast. That is, since the period from the second fuel injection to the ignition is sufficiently short, the flow (turbulence kinetic energy) in the combustion chamber 6 at the ignition timing becomes relatively strong, and the combustion speed after the ignition is accelerated using this flow. Thus, the thermal efficiency is kept high while preventing the abnormal combustion.

The booster 33 is controlled to be ON and performs boosting. The boosting pressure here is adjusted by the bypass valve 39.

The throttle valve 32 is fully opened.

The intake VVT 13a and the exhaust VVT 14a set valve operation timings of the intake and exhaust valves 11 and 12 so that the internal EGR is substantially stopped.

The opening of the EGR valve 53 is controlled so that the air-fuel ratio (A/F) in the combustion chamber 6 becomes the stoichiometric air-fuel ratio ($\lambda$=1) or therearound. For example, the EGR valve 53 adjusts the amount of the exhaust gas recirculated through the EGR passage 51 (external EGR gas) so that the excess air ratio $\lambda$ becomes 1±0.2. Note that near the highest engine load, the EGR valve 53 may be closed to substantially stop the external EGR.

The opening of the swirl valve 18 is set to or near a given intermediate opening (e.g., 50%).

(a-5) Fifth Range

Within a fifth range A5 on the higher speed side of the first to fourth ranges A1 to A4, relatively basic SI combustion is executed. In order to achieve this SI combustion, within the fifth range A5, the various components of the engine are controlled by the ECU 100 as follows.

The injector 15 at least injects the fuel over a given period overlapping with the intake stroke. For example, at an operation point P5 within the fifth range A5, the injector 15 injects the fuel over a continuous period from the intake stroke to the compression stroke, as illustrated in the chart (f) of FIG. 7. Note that at the operation point P5, since it corresponds to a considerably high-speed and high-load condition, the amount of fuel to be injected in one combustion cycle is large and also a crank angle period required for injecting the required amount of fuel becomes long, for which the fuel injection period at the operation point P5 is longer than the other operation points (P1 to P4) described above.

The spark plug 16 ignites the mixture gas near CTDC. For example, at the operation point P5, the spark plug 16 ignites the mixture gas at a slightly advanced timing from CTDC. Further, this ignition triggers the SI combustion, and all the mixture gas in the combustion chamber 6 combusts through flame propagation.

The booster 33 is controlled to be ON and performs boosting. The boosting pressure here is adjusted by the bypass valve 39.

The throttle valve 32 is fully opened.

The opening of the EGR valve 53 is controlled so that the air-fuel ratio (A/F) in the combustion chamber 6 becomes the stoichiometric air-fuel ratio or slightly richer ($\lambda \le 1$).

The swirl valve 18 is fully opened. Thus, not only the first intake port 9A but also the second intake port 9B are fully opened and charging efficiency of the engine is improved.

(b) Control in Partially Warmed-up State

Next, a combustion control in the partially warmed-up state of the engine is described based on the second operation map Q2 (FIG. 5B). When the four operating ranges included in the second operation map Q2 are a sixth range B1, a seventh range B2, an eighth range B3, and a ninth range B4, the sixth range B1 is a combined range of the first and second ranges A1 and A2 of the first operation map Q1 used in the warmed-up state, the seventh range B2 corresponds to the third range A3 of the first operation map Q1, the eighth range B3 corresponds to the fourth range A4 of the first operation map Q1, and the ninth range B4 corresponds to the fifth range A5 of the first operation map Q1.

Within the sixth range B1, similar to the second range A2 in the warmed-up state (first operation map Q1), the control for performing the SPCCI combustion of the mixture gas is executed in the environment in which the air-fuel ratio inside the combustion chamber 6 is substantially the stoichiometric air-fuel ratio ($\lambda$=1). Since the control of the sixth range B1 is basically similar to the control described in (a-2) (the control within the second range A2 in the warmed-up state), the description is omitted here.

Further, since controls within the other ranges B2 to B4 are similar to those within the ranges A3 to A5 in the warmed-up state (first operation map Q1) (described in (a-3) to (a-5)), the description is also omitted.

(c) Control in Cold State

Next, a combustion control in the cold state of the engine is described with reference to the third operation map Q3 (FIG. 5C). When the two operating ranges within the third operation map Q3 are a tenth range C1 and an eleventh range C2, the tenth range C1 corresponds to the first, second, third, and fifth ranges A1, A2, A3, and A5 of the first operation map Q1 used in the warmed-up state, and the eleventh range C2 corresponds to the fourth range A4 of the first operation map Q1.

Within the tenth range C1, mainly a control in which the fuel injected on the intake stroke is mixed with air and subjected to the SI combustion is executed. Since the control within this tenth range C1 is similar to a combustion control of a general gasoline engine, the description is omitted here.

Further, since a control within the eleventh range C2 is similar to that within the fourth range A4 in the warmed-up state (first operation map Q1) (described in (a-4)), the description is also omitted.

(4) About SI Ratio and Combustion Center of Gravity

As described above, in this embodiment, within some operating ranges (the first to third ranges A1 to A3 of the first operation map Q1 and the sixth and seventh ranges B1 and B2 of the second operation map Q2), the SPCCI combustion combining the SI combustion and the CI combustion is performed. In this SPCCI combustion, it is important to control the ratio of the SI combustion with the CI combustion according to the operating condition.

In this embodiment, as this ratio, an SI ratio which is a ratio of a heat generation amount by the SI combustion to the total heat generation amount by the SPCCI combustion (the SI combustion and the CI combustion) is used. FIG. 8 is a chart illustrating this SI ratio and illustrating a change in the heat generation rate (J/deg) according to the crank angle when the SPCCI combustion occurs. The flection point X in the waveform of FIG. 8 is a flection point appearing when the combustion mode switches from the SI combustion to the CI combustion and the crank angle θci corresponding to this flection point X may be defined as the start timing of CI combustion. Further, an area R1 of the waveform of the heat generation rate located on the advance side of this θci (the start timing of CI combustion) is set as the heat generation amount by the SI combustion, and an area R2 of the waveform of the heat generation rate located on the retarding side of θci is the heat generation rate by the CI combustion. Thus, the SI ratio defined by (heat generation amount by SI combustion)/(heat generation amount by SPCCI combustion) may be expressed by R1/(R1+R2) using the respective areas R1 and R2. That is, in this embodiment, the SI ratio=R1/(R1+R2).

The SI ratio is in correlation with a combustion center of gravity which is a timing when a half of the total mass (50% mass portion) of the fuel injected into the combustion chamber 6 in one combustion cycle combusts. For example, since a ratio of the CI combustion at which the mixture gas combusts at a plurality of positions simultaneously increases as the SI ratio decreases, an average combustion speed increases, and the combustion center of gravity advances to approach CTDC. This leads to improving the thermal efficiency but also leads to increasing the combustion noise. On the contrary, since the average combustion speed decreases as the SI ratio increases (as the ratio of the CI combustion decreases), the combustion center of gravity retards to move away from CTDC. This leads to reducing the combustion noise but also leads to degrading the thermal efficiency. In this embodiment, in consideration of such a correlation between the SI ratio and the combustion center of gravity, an optimal combustion center of gravity at which high thermal efficiency is obtained while having the combustion noise below an allowable level is determined as a target combustion center of gravity in advance and an optimal SI ratio corresponding to the target combustion center of gravity is determined as a target SI ratio in advance.

Here, the target combustion center of gravity changes according to the operating condition (speed/load) of the engine. For example, in a high engine load condition in which the heat generation amount is large, since the fuel injection amount is large and a total amount of heat generation within the combustion chamber 6 is large (i.e., the combustion noise easily increases), compared to in a low engine load condition in which the heat generation amount is small, the combustion center of gravity needs to be greatly retarded from CTDC in order to reduce the combustion noise. On the contrary, in the low engine load condition, compared to in the high engine load condition, the heat generation amount is small and the combustion noise does not easily increase. Therefore, it is desirable to set the combustion center of gravity to the advancing side in order to improve the thermal efficiency. For this reason, the target combustion center of gravity is comprehensively set further on the retarding side as the engine load is higher (i.e., further on the advancing side as the engine load is lower). Further, since the progression amount of crank angle per unit time changes according to the engine speed, the optimal combustion center of gravity taking the noise and thermal efficiency into consideration also changes according to the engine speed. Therefore, the target combustion center of gravity is set variably also in accordance with the engine speed in addition to the engine load.

As described above, the target combustion center of gravity changes according to the operating condition (speed/load) of the engine. In other words, the combustion center of gravity is desirably fixed when the engine speed and engine load are in the same condition. Therefore, in this embodiment, the target combustion center of gravity for the case where the engine speed and engine load are in the same condition is set the same regardless of the mode of the SPCCI combustion. For example, even while the SPCCI combustion is performed in the warmed-up state of the engine (while operating within the first to third ranges A1 to A3 of the first operation map Q1), or even while the SPCCI combustion is performed in the partially warmed-up state of the engine (while operating within the first and second ranges B1 and B2 of the second operation map Q2), the target combustion center of gravity is fixed if the engine speed and engine load are in the same condition. Further, although one of the first and second modes is selected within the first range A1 of the first operation map Q1, regardless of which mode the SPCCI combustion is performed, the target combustion center of gravity is still the same as long as the engine speed and engine load are in the same condition.

As described above, since the target combustion center of gravity in the SPCCI combustion changes according to the engine speed and engine load, the target SI ratio is also set variably according to the engine speed and engine load. For example, since the target combustion center of gravity is set further on the retarding side as the engine load is higher as described above, the target SI ratio is set higher as the engine load is higher (i.e., the ratio of the CI combustion decreases as the engine load increases). Further, since the target combustion center of gravity is located at the same position when the engine speed and engine load are the same regardless of the mode of the SPCCI combustion (the warmed-up/partially warmed-up state, or the first/second mode within the first range A1), the target SI ratio is accordingly fixed when the engine speed and engine load are in the same condition.

Moreover in this embodiment, target values of control amounts, such as the ignition timing of the spark plug 16, the fuel injection amount/timing, and in-cylinder state functions, are determined in advance according to the respective operating conditions (engine speed/load) so that the target combustion center of gravity and the target SI ratio which are set as described above are achieved. Note that the in-cylinder state functions referred to here include, for example, the temperature in the combustion chamber 6 and an EGR ratio. The EGR ratio includes an external EGR ratio which is a ratio of the external EGR gas (exhaust gas recirculated to the combustion chamber 6 through the EGR passage 51) to total gas in the combustion chamber 6, and an internal EGR ratio which is a ratio of the internal EGR gas (burned gas remaining in the combustion chamber 6) to the total gas in the combustion chamber 6.

For example, as the ignition timing (the timing of spark-ignition) of the spark plug 16 is advanced, a larger amount of fuel is combusted in the SI combustion, and the SI ratio increases. Further, as the injection timing of the fuel is advanced, a larger amount of fuel is combusted in the CI combustion, and the SI ratio decreases. Alternatively, as the temperature of the combustion chamber 6 rises, a larger amount of fuel is combusted in the CI combustion, and the SI ratio decreases. Moreover, since a change in the SI ratio is followed by a change in the combustion center of gravity, changes in these control amounts (the ignition timing, the injection timing, the in-cylinder temperature, etc.) are factors for adjusting the combustion center of gravity.

Based on such a tendency, in this embodiment, the target values of the ignition timing, the fuel injection amount and timing, and the in-cylinder state functions (temperature, EGR ratio, etc.) are determined in advance for each operating condition so as to achieve a combination of values achievable of the target combustion center of gravity and the target SI ratio described above. In the operation with the SPCCI combustion (i.e., in the operation within the first to third ranges A1 to A3 of the first operation map Q1 or the first and second ranges B1 and B2 of the second operation map Q2), the ECU 100 controls the injector 15, the spark plug 16, the EGR valve 53, the intake and exhaust VVTs 13a and 14a, etc. based on the target values of these control amounts. For example, the spark plug 16 is controlled based on the target value of the ignition timing and the injector 15 is controlled based on the target values of the fuel injection amount and timing. Further, the EGR valve 53 and the intake and exhaust VVTs 13a and 14a are controlled based on the respective target values of the temperature of the combustion chamber 6 and the EGR ratio, and the recirculation amount of exhaust gas (external EGR gas) through the EGR passage 51 and the residual amount of burned gas (internal EGR gas) by the internal EGR are adjusted.

(5) Control in SPCCI Combustion Based on Combustion Center of Gravity

As described above, in this embodiment, the target values of the ignition timing, the fuel injection amount and timing, and the in-cylinder state functions (the temperature, the EGR ratio, etc.) are determined in advance so that the SI ratio and the combustion center of gravity match respective target values (a target SI ratio and a target combustion center of gravity); however, controlling the control amounts (the ignition timing, etc.) to the target values do not guarantee to achieve the target SI ratio and the target combustion center of gravity. Therefore in this embodiment, the combustion center of gravity of the SPCCI combustion is identified for each combustion cycle and the ignition timing is adjusted based on the identified combustion center of gravity.

Figure 9:
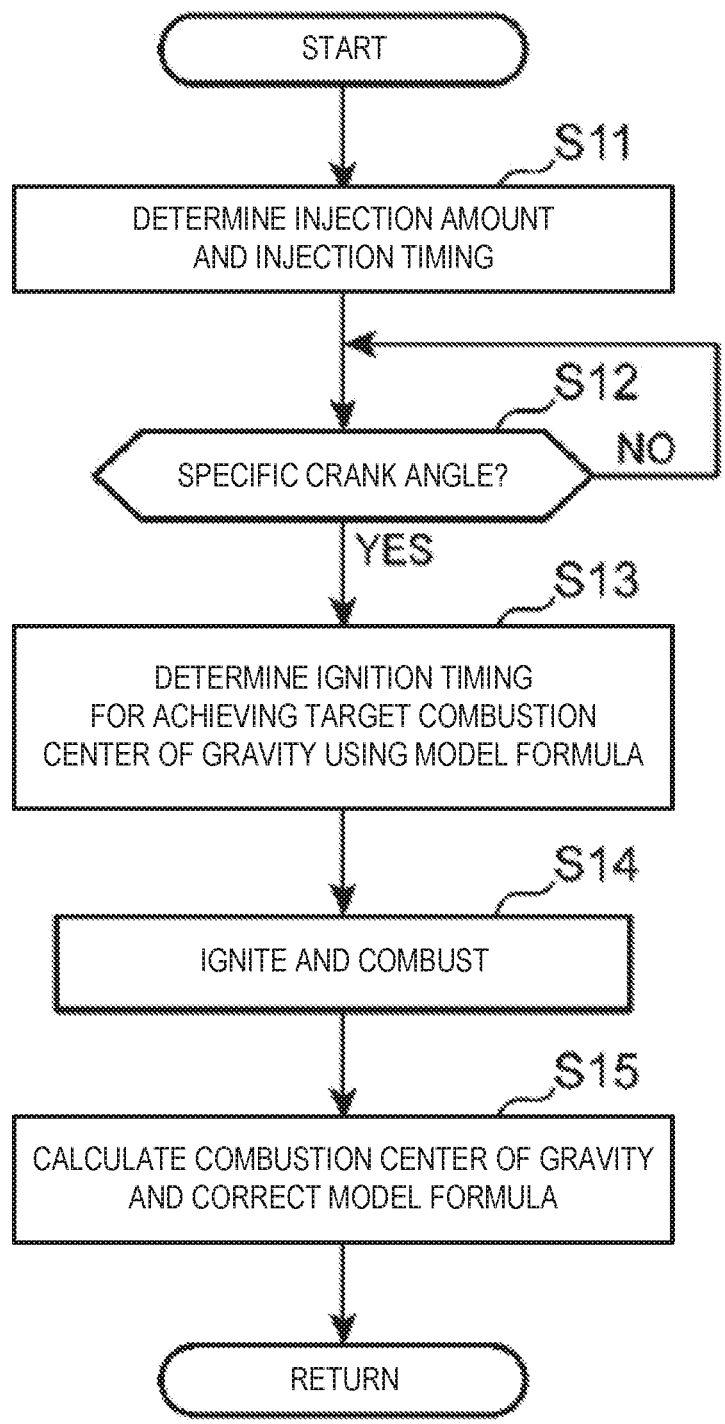
FIG. 9 is a flowchart illustrating details of a control executed in the SPCCI combustion.

FIG. 9 is a flowchart illustrating details of the control executed by the ECU 100 in the SPCCI combustion, that is, in the operation within the first to third ranges A1 to A3 of the first operation map Q1 (in the warmed-up state) illustrated in FIG. 5A and in the operation within the sixth and seventh ranges B1 and B2 of the second operation map Q2 (in the partially warmed-up state) illustrated in FIG. 5B. When the control illustrated in this flowchart starts, at S11, the ECU 100 determines the fuel injection amount from the injector 15 and its injection timing based on the engine speed detected by the crank angle sensor SN1 and the engine load which is identified by the detection value of the accelerator sensor SN10 (accelerator opening), the detection value of the airflow sensor SN4 (intake flow rate), etc. Note that the injection amount and timing of the fuel determined here are the injection amount and timing defined in advance for each operating state of the engine so that the target combustion center of gravity is achieved.

Next, the ECU 100 shifts to S12 to determine whether the current crank angle is a specific crank angle based on the detection value of the crank angle sensor SN1. This specific crank angle is determined in advance as the timing for determining the ignition timing by the spark plug 16, for example, about 60° C. A before CTDC.

If S12 is YES and it is confirmed that the current crank angle is the specific crank angle, the ECU 100 shifts to S13 to determine the ignition timing for achieving the target combustion center of gravity.

For example, at S13, the ECU 100 determines the ignition timing for achieving the target combustion center of gravity based on an initial target value of the ignition timing determined corresponding to the target combustion center of gravity (hereinafter, referred to as the default ignition timing) and the in-cylinder state functions at the specific crank angles. Note that the in-cylinder state functions, i.e., the temperature of the combustion chamber 6, the EGR ratio, etc. are predictable based on the detection values of the second intake air temperature sensor SN7, the second intake air pressure sensor SN8, the pressure difference sensor SN9, etc.

In this embodiment, in order to determine the ignition timing, a model formula is prepared in advance for determining a correction amount of the ignition timing based on the in-cylinder state functions at the specific crank angle timing. For example, the ignition timing is required to be deviated greater from the default ignition timing as the in-cylinder state functions at the specific crank angle timing deviate greater from their target values. On the other hand, in this embodiment, since the initial target values are adopted as they are as the fuel injection amount and timing as described at S11, the deviations in the fuel injection amount and timing from the target values are not required to be taken into consideration. Therefore, in this embodiment, an arithmetic formula having the deviation amounts of the in-cylinder state functions from the target values as an input element and the correction amount of the ignition timing as an output element is prepared in advance as the model formula. In other words, by inputting the deviation amounts of the in-cylinder state functions from the target values into the model formula, the correction amount of the ignition timing required to match the combustion center of gravity with the target combustion center of gravity (the correction amount from the default ignition timing) is obtained. At S13, a timing retarded or advanced from the default ignition timing by the correction amount calculated based on the model formula is determined as the final ignition timing. Note that when the in-cylinder state functions at the specific crank angle timing is the same as the target value, the default ignition timing is adopted as the ignition timing as it is.

Next, the ECU 100 shifts to S14 to cause the spark plug 16 to ignite at the ignition timing determined at S13, so as to trigger the SPCCI combustion of the mixture gas.

Next, the ECU 100 shifts to S15 to calculate the combustion center of gravity based on the in-cylinder pressure detected over a given period overlapping with the combustion period of the SPCCI combustion (the period from the start until the end of combustion), and correct the model formula used at S13, based on the calculated combustion center of gravity. That is, the ECU 100 calculates the heat generation amount accompanying the combustion for each crank angle based on the waveform of the in-cylinder pressure detected by the in-cylinder pressure sensor SN3 during the given period, and the combustion center of gravity at the timing when a 50% mass portion of the fuel combusts based on the data of the heat generation amount for each crank angle. Further, a deviation amount between this calculated combustion center of gravity and the target combustion center of gravity is calculated and, based on this calculated deviation amount, the model formula for determining the ignition timing (the ignition timing for achieving the target combustion center of gravity) is corrected. This correction of the model formula leads to an improvement of accuracy in determining the ignition timing next time in a similar condition.

(6) Mode Switch Control in Warmed-up State

As described in (a-1) of Section (3), in the warmed-up state of the engine, the first operation map Q1 illustrated in FIG. 5A is selected, and when operating within the first range A1 of the first operation map Q1, the SPCCI combustion is performed in one of the two modes (first/second mode) with different air-fuel ratios (A/F) selectively. Next, details of this mode switching will be described with reference to the flowcharts of FIG. 10.

Figure 10:
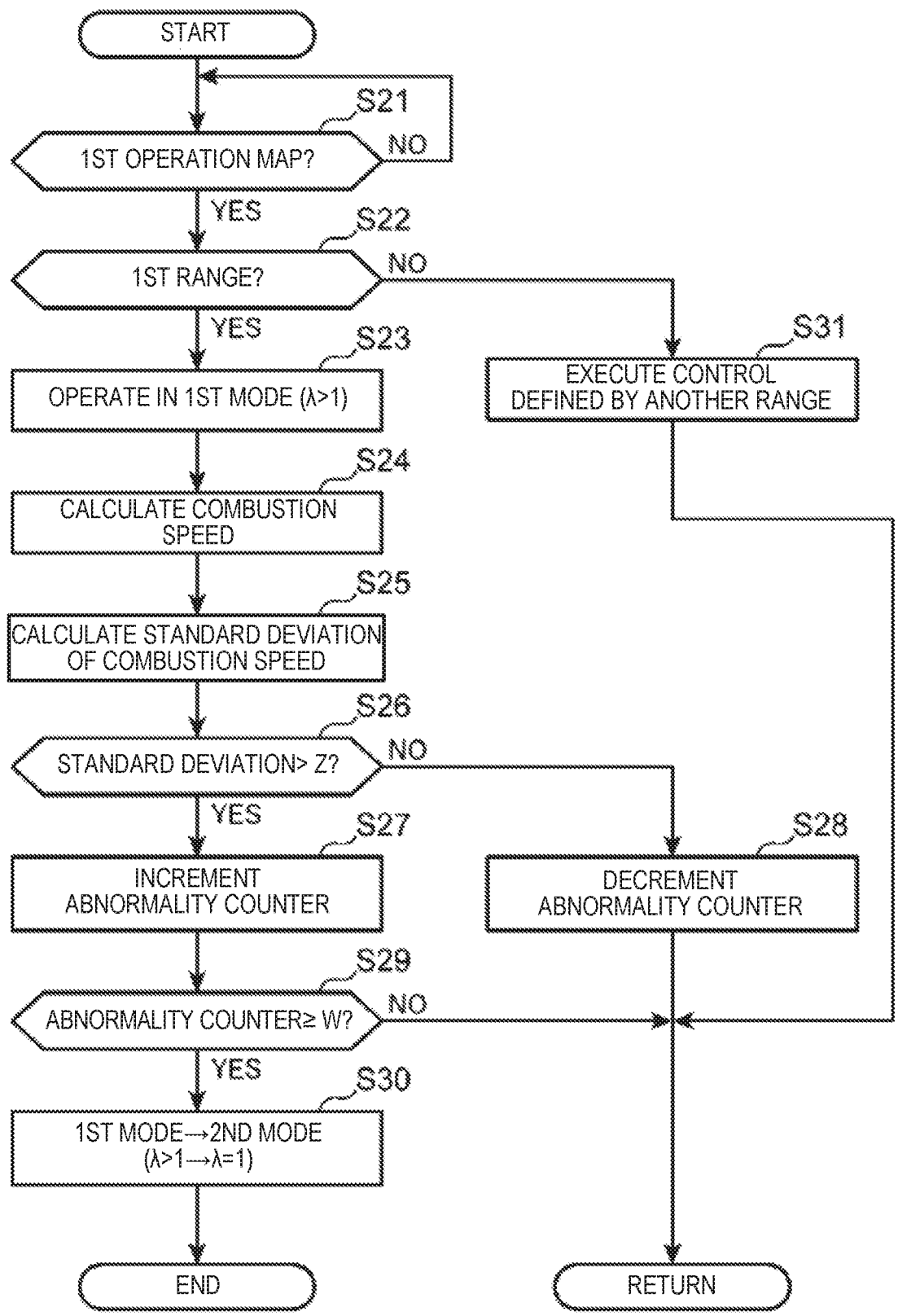
FIG. 10 is a flowchart illustrating details of a control executed in a first range in the first operation map.

When the control illustrated in the flowchart of FIG. 10 starts, at S21, the ECU 100 determines whether the first operation map Q1 (FIG. 5A) is selected as the current operation map, that is, whether the engine is in the warmed-up state (a state where one of the engine water temperature≥80° C. and the intake air temperature≥50° C. is established).

When S21 is YES and it is confirmed that the first operation map Q1 is selected, the ECU 100 shifts to S22 to determine whether the engine is operated within the first range A1 of the first operation map Q1. That is, based on the engine speed detected by the crank angle sensor SN1 and the engine load specified by the detection value of the accelerator sensor SN10 (accelerator opening), the detection value of the airflow sensor SN4 (intake flow rate), etc., the ECU 100 specifies the current operation point of the engine and determines whether the operation point is within the first range A1 of the first operation map Q1.

If S22 is NO and it is confirmed that the operation point is outside the first range A1, the ECU 100 shifts to S31 to execute a control defined by the operating range corresponding to the outside the first range A1 (one of the second to fifth ranges A2 to A5).

On the other hand, when S22 is YES and it is confirmed that the operation point is within the first range A1, the ECU 100 shifts to S23 to select, as one of the two combustion modes defined within the first range A1, the first mode in which the SPCCI combustion is performed in the lean air-fuel ratio environment in which the excess air ratio λ is larger than 1. Details of the combustion control in the first mode are as described in (a-1) of Section (3).

Next, the ECU 100 shifts to S24 to calculate the average combustion speed of an early half portion of the SPCCI combustion based on the in-cylinder pressure detected by the in-cylinder pressure sensor SN3.

Figure 11:
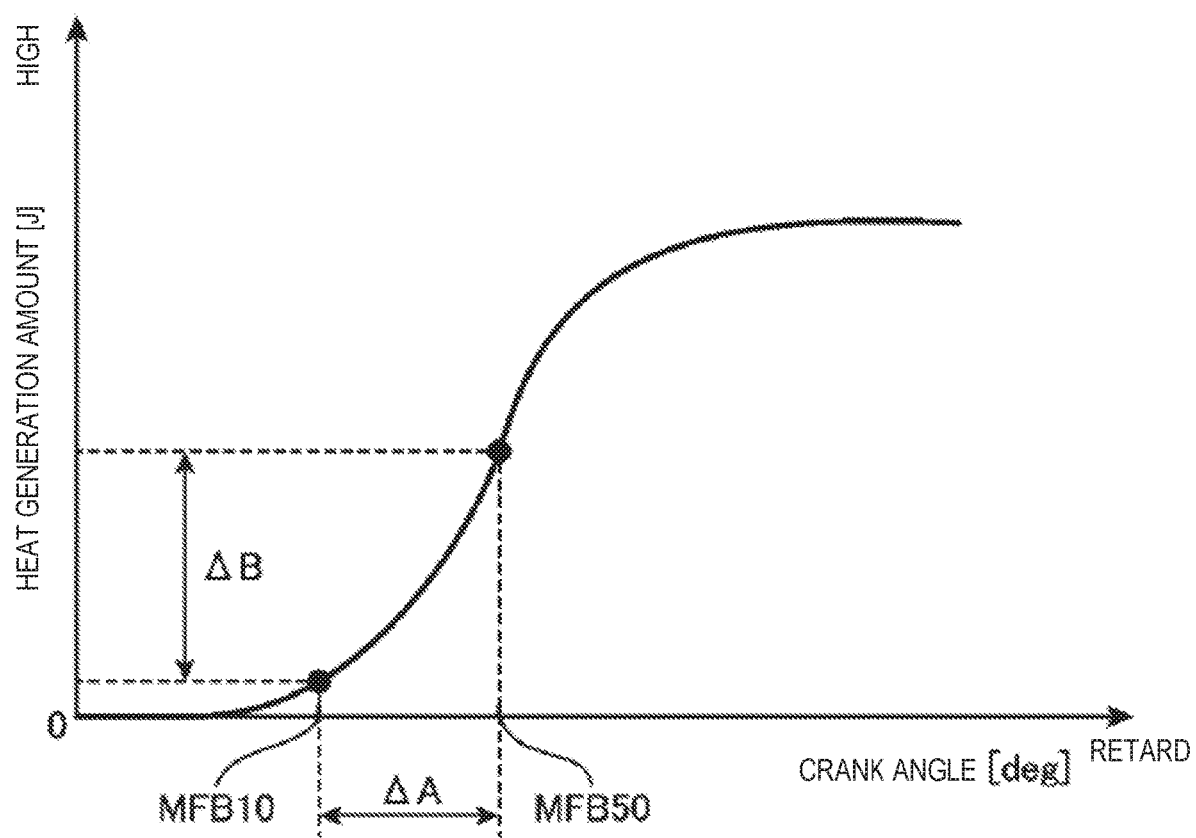
FIG. 11 is a chart illustrating process to calculate combustion speed based on a waveform of a heat generation amount.

FIG. 11 is a chart illustrating a procedure for calculating the combustion speed at S24, illustrating data of the heat generation amount which changes according to progression of the crank angle. The data of this heat generation amount is obtained based on the in-cylinder pressure detected by the in-cylinder pressure sensor SN3. At S24, the ECU 100 identifies MFB10 which is a timing when a 10% mass portion of the fuel supplied to the combustion chamber 6 in one combustion cycle combusts and MFB50 which is a timing when a 50% mass portion of the fuel combusts (i.e., the combustion center of gravity), based on the data of the heat generation amount illustrated in FIG. 11. Then, based on a difference AA in crank angle between MFB10 and MFB50 and a difference AB in heat generation amount between MFB10 and MFB50, the average combustion speed (=AB/AA) of the early half portion of the combustion is calculated. Note that MFB10 in FIG. 11 may be referred to "first mass combustion timing" and MFB50 may be referred to as "second mass combustion timing."

Next the ECU 100 shifts to S25 to calculate a standard deviation which is an index of a variation in the combustion speed between cycles, based on history data storing the combustion speeds calculated at S24. The history data for calculating this standard deviation is an accumulation of data for a given number of previous cycles, including the data of the combustion speed calculated most recently at S24. Here, when the number of cycles already performed after the SPCCI combustion in the first mode (λ>1) (S23) is started is below the given number of cycles, the data of the combustion speeds in all the cycles after the SPCCI combustion in the first mode is started is used as the history data. Note that for the sake of convenience, a minimum number of data required for obtaining the standard deviation may be defined beforehand so that the standard deviation is calculated as zero while the minimum number of data required has not been accumulated.

Next, the ECU 100 shifts to S26 to determine whether the standard deviation of the combustion speed calculated at S25 is larger than a given threshold Z. The threshold Z is defined for checking the combustion stability and the standard deviation above the threshold Z means that the combustion stability is relatively low.

If S26 is YES and it is confirmed that the standard deviation of the combustion speed exceeds the threshold Z, the ECU 100 shifts to S27 to increment an abnormality counter by 1 (a default value is zero). Conversely, if S26 is NO and it is confirmed that the standard deviation of the combustion speed is below the threshold Z, the ECU 100 shifts to S28 to decrement the abnormality counter by 1.

Next, the ECU 100 shifts to S29 to determine whether the abnormality counter as the result of S27 or S28 indicates above a given number W. Note that the given number W used here is an integer of at least 2 or above.

If S29 is YES and it is confirmed that the abnormality counter indicates above the given number W, that is, combustion with relatively poor combustion stability is confirmed a plurality of times in sequence, the ECU 100 shifts to S30 to switch the combustion mode from the first mode (λ>1) to the second mode (λ=1). That is, the combustion mode is switched from the first mode in which the SPCCI combustion is performed in the lean air-fuel ratio environment in which the excess air ratio λ is larger than 1, to the second mode in which the SPCCI combustion is performed in the stoichiometric environment in which the excess air ratio λ is substantially 1. In switching to the second mode, the air amount (fresh air amount) introduced into the combustion chamber 6 needs to be reduced. Therefore, as a specific control at S30, a control for at least narrowing the opening of the throttle valve 32 is executed so as to reduce the air amount inside the combustion chamber 6 to the amount corresponding to the stoichiometric air-fuel ratio.

Note that although is not described in detail, after switching from the first mode to the second mode at S30, the SPCCI combustion continues in the second mode for a while before being switched to the SPCCI combustion in the first mode. After resuming to the first mode, the control of the flowchart of FIG. 10 described above is repeated again.

(7) Operations and Effects

As described above, in this embodiment, within the first range A1 of the first operation map Q1 used in the warmed-up state of the engine, the SPCCI combustion in the first mode in which the air-fuel ratio (A/F) is larger than the stoichiometric air-fuel ratio and the SPCCI combustion in the second mode in which the air-fuel ratio is substantially the stoichiometric air-fuel ratio are selectively performed. For example, when it is confirmed during the SPCCI combustion in the first mode, that the combustion stability is low based on the detection value of the in-cylinder pressure sensor SN3, the combustion mode is switched from the first mode to the second mode, the opening of the throttle valve 32 is narrowed to enrich the air-fuel ratio to the stoichiometric air-fuel ratio and the introduction amount of gas into the combustion chamber 6 is reduced. This configuration is advantageous in securing high combustion stability while improving the thermal efficiency of the SPCCI combustion as much as possible.

That is, in this embodiment, when low combustion stability is confirmed during the SPCCI combustion in the first mode where the air-fuel ratio (A/F) is made larger than the stoichiometric air-fuel ratio, the combustion mode is switched to the second mode where the SPCCI combustion is performed in the state where the air-fuel ratio is made substantially to the stoichiometric air-fuel ratio. This switching causes a formation of a rich fuel environment inside the combustion chamber 6, which stimulates the formation of the flame core after the spark ignition. Thus, a sufficient size of flame core is stably formed and, as a result, the stability of the SPCCI combustion is improved.

In other words, since the first mode is kept and the air-fuel ratio is made larger than the stoichiometric air-fuel ratio unless the combustion stability drops, the period in which the SPCCI combustion is performed in the lean fuel environment, which is advantageous in terms of the thermal efficiency, is secured as long as possible, and the fuel efficiency of the engine is effectively improved.

Moreover, in this embodiment, MFB10 and MFB50 which are the timings when the given mass ratio portions (10% and 50% mass) of the fuel supplied in one combustion cycle combust, respectively, are identified, and the combustion stability is determined based on the identified combustion timings (MFB10 and MFB50). Therefore, the combustion stability is appropriately determined based on the combustion timings (MFB10 and MFB50) which change according to the change in the combustion speed of the mixture gas.

Specifically, in this embodiment, the standard deviation of the combustion speed (the variation in the combustion speed between cycles) is identified based on the data obtained by accumulating for each cycle the combustion speeds calculated at MFB10 and MFB50. Further, the combustion stability is determined based on the identified standard deviation, thus the combustion stability is determined more appropriately.

In this embodiment, the target combustion center of gravity (and the target SI ratio) when performing the SPCCI combustion is determined in advance for each engine speed and each engine load, and the target values of the control amounts, such as the ignition timing by the spark plug 16, the injection amount/timing of the fuel, and the in-cylinder state functions (the temperature, the EGR ratio, etc.), are determined in advance so that the target combustion center of gravity (and the target SI ratio) is obtained. Further, in a case where the engine is operating within the first range A1 in the warmed-up state (the first operation map Q1), when either of the first mode and the second mode is selected, the target combustion center of gravity is set to locate at the same position as long as the engine speed and load are the same and the ignition timing is adjusted so as to achieve the same target combustion center of gravity. According to such a configuration, since the combustion center of gravity does not largely deviate even when the combustion mode is switched between the first mode and the second mode, a change in torque when switching the mode (a difference in output torque before and after switching) is reduced, and a smooth mode switching which is not easily perceived by a passenger is achieved.

(8) Modifications

In this embodiment, during the SPCCI combustion, MFB10 and MFB50 which are the timings when the 10% mass portion of the fuel and the 50% mass portion of the fuel combust, respectively, are identified based on the waveform of the in-cylinder pressure detected by the in-cylinder pressure sensor SN3 (detector), the average combustion speed of the early half portion of the combustion is calculated based on the identified combustion timings (MFB10 and MFB50), and the combustion stability is determined based on the standard deviation of the combustion speed calculated based on the history data of the combustion speed. Alternatively, instead of the standard deviation of the combustion speed itself, a difference between a standard value of the combustion speed defined for each operating condition and the combustion speed calculated for each cycle may be obtained and the combustion stability may be determined based on a standard deviation of the difference.

In this embodiment, the combustion stability is determined based on the variation (standard deviation) in the combustion speed. Alternatively, the combustion stability may be determined based on a variation in the timing when a given mass ratio portion of the fuel combusts. Further, θci (the start timing of the CI combustion) which appears as the flection point X in the waveform illustrated in FIG. 8 may be identified based on the detection value of the in-cylinder pressure sensor SN3 and the combustion stability may be determined based on a variation in θci between cycles.

Moreover, the parameter detected by the detector in order for the combustion stability determination may be any parameter which changes according to the progress of combustion, and is not limited to the in-cylinder pressure. For example, a temperature sensor which detects the temperature inside the combustion chamber 6 highly responsively may be provided as the detector. Alternatively, a noise sensor which detects combustion noise occurring due to combustion (sound pressure) or a vibration sensor which detects vibration of the engine body 1 (vibration acceleration) may be provided as the detector.

In this embodiment, when it is confirmed that the combustion stability is low within the first range A1 of the first operation map Q1 used in the warmed-up state of the engine, the first mode where the SPCCI combustion is performed in the lean environment in which the air-fuel ratio (A/F) is larger than the stoichiometric air-fuel ratio is switched to the second mode where the SPCCI combustion is performed in the stoichiometric environment in which the air-fuel ratio is substantially the stoichiometric air-fuel ratio, and in this switching, the opening of the throttle valve 32 is narrowed to reduce the intake air amount to the combustion chamber 6. In addition to (or alternatively to) such a reduction of the air amount, the fuel injection amount from the injector 15 may be increased to reduce the air-fuel ratio (A/F).

Although in this embodiment, the booster 33 mechanically driven by the engine body 1 is provided in the intake passage 30, instead of such a mechanical booster 33 (supercharger), an electric booster driven by a motor, or a turbocharger driven by the energy of the exhaust gas may be provided.

Although in this embodiment, the cavity 20 having a donut shape in the plan view to surround the conical-shaped bulge portion 20a is formed in the crown surface of the piston 5, the concave portion of the cavity 20 facing the spark plug 16, that is, the concave portion located on the intake side of the bulge portion 20a, may be formed so as to be smaller than the concave portion on the opposite side (exhaust side). In this manner, when the fuel is injected from the injector 15 in the final stage of the compression stroke, fuel spray is moved to the vicinity of the electrode of the spark plug 16 more promptly.

Although in this embodiment, the intake and exhaust VVTs 13a and 14a are controlled to form the valve overlap period in which both the intake and exhaust valves 11 and 12 are opened over TDC of the exhaust stroke when performing the internal EGR in which the burned gas is left in the combustion chamber 6, conversely, the internal EGR may be performed by forming a so-called negative overlap period in which both the intake and exhaust valves 11 and 12 are closed over TDC of the exhaust stroke.

In this embodiment, the swirl valve 18 is provided to one of the two intake ports 9A and 9B (the second intake port 9B) provided to one cylinder 2, and the opening of the swirl valve 18 is changed to adjust the strength of the swirl flow. However, the method of adjusting the strength of the swirl flow is not limited to this. For example, the strength of the swirl flow may be adjusted by setting the lift amount of the intake valve 11 which opens and closes the first intake port 9A and the lift amount of the intake valve 11 which opens and closes the second intake port 9B different from each other or the operating timings of these two intake valves 11 are different from each other.

Although in this embodiment, the optimal target combustion center of gravity at which the combustion noise and the thermal efficiency are in balance is determined in advance for each engine operating condition (engine speed/load) and, during the SPCCI combustion, the ignition timing which is required to achieve the target combustion center of gravity (correction amount from the target value) is obtained based on the model formula by using the in-cylinder state functions (EGR ratio, temperature, etc.) at the specific crank angle, instead of or in addition to the ignition timing, the fuel injection timing from the injector 15 may be adjusted. Alternatively, both of the fuel injection timing and the fuel injection amount may be adjusted.

Additionally (or alternatively), a feedback control based on the combustion center of gravity or the SI ratio may be executed.

For example, when executing the feedback control based on the combustion center of gravity, the combustion center of gravity is calculated for each combustion (SPCCI combustion) based on the detected waveform of the in-cylinder pressure sensor SN3, etc., and when the calculated combustion center of gravity deviates from the target combustion center of gravity, the ignition timing, the injection amount/timing, etc. are corrected to reduce the deviation.

Similarly, when performing the feedback control based on the SI ratio, the SI ratio in each combustion is calculated based on the detected waveform of the in-cylinder pressure sensor SN3 etc., and when the calculated SI ratio deviates from the target SI ratio, the ignition timing, the fuel injection amount/timing, etc. are corrected to reduce the deviation.

Note that when calculating the SI ratio of each combustion as described above, various specific methods can be considered to calculate this SI ratio.

For example, the heat generation rate at each crank angle timing may be calculated from the detected waveform by the in-cylinder pressure sensor SN3, and the areas R1 and R2 illustrated in FIG. 8 may be calculated based on the data (waveform) of the calculated heat generation rate. In this case, although the SI ratio may be calculated as SI ratio=R1/(R1+R2) as described above, alternatively, SI ratio=R1/R2 may be established.

Figure 12:
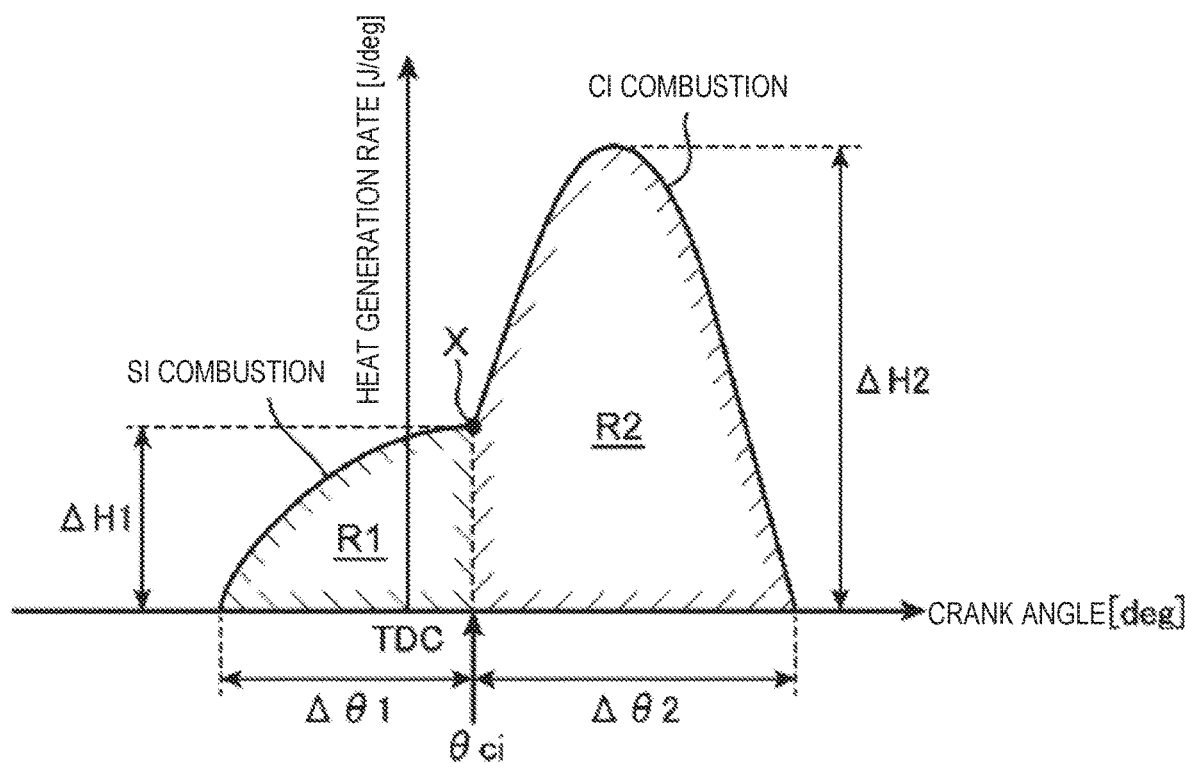
FIG. 12 is a chart corresponding to FIG. 8, illustrating various defining methods of an SI ratio.

Further, the SI ratio may be calculated using $\Delta\theta 1$ and $\Delta\theta 2$ illustrated in FIG. 12. That is, when the crank angle period of the SI combustion (the crank angle period on the advancing side of the flection point X) is $\Delta\theta 1$ and the crank angle period of the CI combustion (the crank angle period on the retarding side of the flection point X) is $\Delta\theta 2$, SI ratio=$\Delta\theta 1$/($\Delta H1+\Delta H2$) or SI ratio=$\Delta H1/\Delta H$ may be established.

Furthermore, when a peak of the heat generation rate of the SI combustion is $\Delta H1$ and a peak of the heat generation rate of the CI combustion is $\Delta H2$, SI ratio=$\Delta H1/(\Delta H1+\Delta H2)$ or SI ratio=$\Delta H1/\Delta H2$ may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
Cylinder
13a Intake VVT (A/F Controller)
14a Exhaust VVT (A/F Controller)
15 Injector
16 Spark Plug
32 Throttle Valve (A/F Controller)
53 EGR Valve (A/F Controller)
100 ECU (Combustion controller)
SN3 In-cylinder Pressure Sensor (Detector)

What is claimed is:

1. A control device for a compression-ignition engine in which partial compression-ignition combustion including spark ignition (SI) combustion performed by combusting a portion of a mixture gas inside a cylinder by spark-ignition followed by compression ignition (CI) combustion performed by causing the remaining mixture gas inside the cylinder to self-ignite is executed at least within a part of an operating range of the engine, comprising:

a detector configured to detect a given parameter that changes as combustion progresses inside the cylinder;

an A/F (air-fuel ratio) controller configured to change an air-fuel ratio of air to fuel introduced into the cylinder; and a combustion controller configured to determine combustion stability based on the detected parameter of the detector and control the A/F controller to reduce the air-fuel ratio when it is confirmed that during the partial compression-ignition combustion the combustion stability is low, wherein the combustion controller identifies based on the detected parameter of the detector, a given mass combustion timing at which a given mass ratio of part of fuel supplied to the cylinder in one combustion cycle combusts, and determines the combustion stability based on the identified given mass combustion timing.

2. The device of claim 1, wherein the combustion controller identifies a first mass combustion timing at which a given first mass ratio of fuel combusts and a second mass combustion timing at which a second mass ratio that is higher than the first mass ratio combusts, and determines the combustion stability based on a variation in combustion speed between cycles calculated based on the first and second mass combustion timings.

3. A control device for a compression-ignition engine in which partial compression-ignition combustion including spark ignition (SI) combustion performed by combusting a portion of a mixture gas inside a cylinder by spark-ignition followed by compression ignition (CI) combustion performed by causing the remaining mixture gas inside the cylinder to self-ignite is executed at least within a part of an operating range of the engine, comprising:

a detector configured to detect a given parameter that changes as combustion progresses inside the cylinder;

an A/F (air-fuel ratio) controller configured to change an air-fuel ratio of air to fuel introduced into the cylinder; and a combustion controller configured to determine combustion stability based on the detected parameter of the detector and control the A/F controller to reduce the air-fuel ratio when it is confirmed that during the partial compression-ignition combustion the combustion stability is low, wherein the combustion controller selects, as a combustion mode of the partial compression-ignition combustion, one of a first mode in which the partial compression-ignition combustion is performed in an environment in which the air-fuel ratio is higher than a stoichiometric air-fuel ratio and a second mode in which the partial compression-ignition combustion is performed in an environment in which a gas-fuel ratio is higher than the stoichiometric air-fuel ratio and the air-fuel ratio is substantially the stoichiometric air-fuel ratio, and when it is confirmed during the partial compression-ignition combustion in the first mode, that the combustion stability is low, the combustion controller switches the combustion mode from the first mode to the second mode, the gas-fuel ratio being a ratio of a total gas including exhaust gas recirculation (EGR) gas to fuel inside the cylinder.

4. The device of claim 3, wherein the combustion controller controls a timing of the spark ignition so that a combustion center of gravity of the partial compression-ignition combustion in the first mode and a combustion center of gravity of the partial compression-ignition combustion in the second mode are located at the same position when an engine speed and an engine load are the same in the first mode and the second mode.

5. The device of claim 1, wherein the combustion controller identifies a start timing that is a start timing of the CI combustion based on the detected parameter of the detector and determines the combustion stability based on a variation in the start timing between cycles.

6. The device of claim 1, wherein the detector is an in-cylinder pressure sensor configured to detect pressure inside the cylinder as the parameter.

* * * * *